(12) United States Patent
Sugimoto et al.

(10) Patent No.: US 6,787,076 B2
(45) Date of Patent: Sep. 7, 2004

(54) THERMOPLASTIC ELASTOMER COMPOSITION FOR POWDER MOLDING, POWDER AND MOLDED ARTICLE THEREOF

(75) Inventors: Hiroyuki Sugimoto, Funabashi (JP); Yoshihiro Nakatsuji, Chiba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 14 days.

(21) Appl. No.: 10/314,138

(22) Filed: Dec. 9, 2002

(65) Prior Publication Data

US 2003/0176575 A1 Sep. 18, 2003

Related U.S. Application Data

(62) Division of application No. 09/584,400, filed on Jun. 1, 2000, now Pat. No. 6,521,705.

(30) Foreign Application Priority Data

Jun. 4, 1999 (JP) ............................. 11-158195
Jan. 14, 2000 (JP) ....................... 2000-005605
May 11, 2000 (JP) ....................... 2000-138362

(51) Int. Cl.$^7$ ................................................. B32B 5/18
(52) U.S. Cl. ....................... 264/41; 264/45.1; 264/45.9; 264/46.1; 264/241; 264/510; 428/319.3; 428/319.7; 428/319.9; 428/521
(58) Field of Search .................. 264/41, 45.1, 45.9, 264/46.1, 241, 510; 428/319.3, 319.7, 319.9, 521

(56) References Cited

U.S. PATENT DOCUMENTS

| 5,191,024 A | 3/1993 | Shibata et al. |
| 5,948,850 A | 9/1999 | Enami et al. |
| 5,977,259 A | 11/1999 | Sugimoto et al. |

FOREIGN PATENT DOCUMENTS

| DE | 197 57 398 A1 | 6/1998 |
| DE | 199 17 551 A1 | 10/1999 |
| EP | 0 834 533 A1 | 4/1998 |
| EP | 0 881 258 A2 | 12/1998 |
| EP | 0 987 287 A1 | 3/2000 |
| GB | 2 270 915 A | 3/1994 |
| JP | 3-72512 A | 3/1991 |
| JP | 06-136191 | 5/1994 |
| JP | 06-287365 | 10/1994 |
| JP | 07/48485 | 2/1995 |
| JP | 07-82433 | 3/1995 |
| JP | 8-27330 A | 1/1996 |
| JP | 8-113695 A | 5/1996 |
| JP | 11-60826 | 3/1999 |
| WO | WO 99/29775 | 6/1999 |
| WO | WO 99/38912 | 8/1999 |

*Primary Examiner*—Jeffrey Mullis
(74) *Attorney, Agent, or Firm*—Sughrue Mion, PLLC

(57) ABSTRACT

A thermoplastic elastomer composition for powder molding comprising 100 parts by weight of a polyolefin-based resin (A) and 10 to 1000 parts by weight of a specific hydrogenated vinyl aromatic compound-conjugated diene-based block copolymer(B), a powder of the thermoplastic elastomer composition, a method for powder molding the same, a molded article obtained by the method for powder molding, and a multi-layer molded article containing the molded article as one layer.

12 Claims, No Drawings

THERMOPLASTIC ELASTOMER COMPOSITION FOR POWDER MOLDING, POWDER AND MOLDED ARTICLE THEREOF

This is a divisional of Application No. 09/584,400 filed Jun. 1, 2000 now U.S. Pat. No. 6,521,705; the disclosure of which is incorporated herein by reference.

BACKGROUND OF THE INVENTION

1. Field of the Invention

The present invention relates to a thermoplastic elastomer composition for powder molding, powder, a powder molding method and a molded article. More specifically, the present invention relates to a thermoplastic elastomer composition for powder molding which comprises a polyolefin-based resin and a hydrogenated diene-based copolymer having a specific structure as essential components, and which can provide a molded article that is not easily whitened on bending, and does not generate gloss when heated at temperatures from about 80° C. to less than the melting point of the polyolefin-based resin; a powder composed of said composition; a powder molding method using said powder; a molded article obtained by powder-molding said powder; and a multi-layer molded article using said molded article.

2. Description of the Related Arts

Conventionally, molded articles in the form of a sheet having on the surface complicated uneven patterns such as leather grains, stitches and the like are used as skin materials of automobile interior parts or the like. As such molded articles, there have been proposed molded articles obtained by powder molding of a powder which is produced by pulverizing an olefin-based thermoplastic elastomer, for replacing conventional molded articles of vinyl chloride-based resins (see, e.g., JP-A-05-1183 and JP-A-05-5050). However, a molded article obtained by such a method is harder and has a property that it is easily whitened on bending, as compared with vinyl chloride-based resin molded articles, therefore, there was a tendency that the bent portion was whitened to cause appearance failure when the molded article was released from a mold after production and when the molded article was molded into intended form, and the like. Further, JP-A-07-82443 discloses a powder resin composition composed of a polyolefin-based resin and a hydrogenated styrene-butadiene rubber having a styrene content of 20% by weight or less, and JP-A-03-72512 discloses a thermoplastic elastomer composition composed of a non-polar resin such as polypropylene or the like, and a hydrogenated diene-based copolymer having a specific structure.

A molded article obtained by powder molding of these powder resin compositions had a problem that when used as an automobile interior material, appearance failure occurs, since the molded article reveals gloss when heated at a temperatures from about 80° C. to less than the melting point of the polyolefin-based resin (it is known that when an automobile is left outdoor in summer, temperature of the surface of automobile interior materials such as an instrument panel reaches up to about 80 to 120° C.) though when the molded article is bent, the bent portion is not whitened.

Two-layer molded articles constituted of a skin layer composed of a vinyl chloride-based resin and a foamed layer composed of a polyurethane-based resin are widely used for automobile interior parts such as an instrument panel, console box, door trim and the like. Recently, there is an effort to unify a skin layer and a foamed layer into a thermoplastic elastomer composition material from viewpoints of recycle and the like, however, there has not been known a two-layer molded article in which both of a skin layer and a foamed layer are composed of a thermoplastic elastomer composition, and which is not whitened on bending, does not reveal gloss when heated at temperatures from about 80° C. to less the melting point of the polyolefin-based resin, and has excellent cushioning property.

SUMMARY OF THE INVENTION

An object of the present invention is to provide a thermoplastic elastomer composition for powder molding which comprises a polyolefin-based resin and a hydrogenated diene-based copolymer having a specific structure as essential components, and which can provide a molded article that is excellent in flexibility, is not easily whitened on bending in the bent portion, and further, does not generate gloss when heated at temperatures from about 80° C. to less than the melting point of the polyolefin-based resin, a powder composed of said composition and a powder molding method using said powder.

Another object of the present invention is to provide a molded article obtained by powder-molding this powder and a two-layer or multi-layer (three or more layer) molded article using this molded article.

Still another object of the present invention is to provide a two-layer or multi-layer molded article having an excellent cushioning property in addition to the above-descried properties, comprising the above-mentioned molded article as a skin layer and a foamed layer composed of a thermoplastic elastomer composition containing a polyolefin-based resin and a rubbery polymer having a specific structure.

Other objects and advantages of the present invention will be apparent from descriptions below.

Namely, the present invention relates to a thermoplastic elastomer composition for powder molding comprising 100 parts by weight of the following component (A) and 10 to 1000 parts by weigh of the following component (B), wherein the complex dynamic viscosity $\eta^*(1)$ at 250° C. is $1.5 \times 10^5$ poise or less, and the Newtonian viscosity index n is 0.67 or less:

(A): a polyolefin-based resin,
(B): a hydrogenated diene-based copolymer satisfying all of the following conditions ① to ⑦,
① : the hydrogenated diene-based copolymer contains the following structural units (a) and (b):
(a): a vinyl aromatic compound polymer block,
(b): at least one block selected from the group consisting of following (b1), (b2) and (b3):
(b1): a block obtained by hydrogenation of a random copolymer block composed of a vinyl aromatic compound and a conjugated diene,
(b2): a block obtained by hydrogenation of a tapered copolymer block composed of a vinyl aromatic compound and a conjugated diene in which the amount of the vinyl aromatic compound increases gradually,
(b3): a block obtained by hydrogenation of a conjugated diene polymer block,
② : the total content(T: percentage) of vinyl aromatic compound units contained in the hydrogenated diene-based copolymer is from 10 to 18% by weight,
③ : the ratio (S: percentage) of the content of the vinyl aromatic compound unit of (a) in ① to the total content of vinyl aromatic compound units contained in the hydrogenated diene-based copolymer is 3% or more, ④: the ratio (V: percentage) of the number of hydrogenated conjugated diene units having a side chain of two or more carbon atoms to the total number of hydrogenated conjugated diene units in the hydrogenated diene-based copolymer is over 60%, ⑤: (T) in ②, (S) in ③ and (V) in ④ in the hydrogenated diene-based copolymer satisfy the relation represented by the following expression (1):

$$V \leq 0.375 \times S + 1.25 \times T + 40 \quad (1)$$

⑥: 80% or more of double bonds derived from conjugated diene units in the hydrogenated diene-based copolymer are hydrogenated, and ⑦: the number average molecular weight of the hydrogenated diene-based copolymer is from 50000 to 400000.

Further, the present invention relates to a powder of the above-mentioned thermoplastic elastomer composition for powder molding and a powder molding method using said powder.

Furthermore, the present invention relates to a molded article obtained by powder-molding the powder, and a two-layer or multi-layer molded article containing said molded article and a method for producing the same.

Still further, the present invention relates to a two-layer molded article comprising (I) a layer of the above-mentioned thermoplastic elastomer composition for powder molding and (II) a layer described below:

(II): a foamed layer composed of a thermoplastic elastomer composition containing 100 parts by weight of the following component (G) and 10 to 1000 parts by weight of the following component (H):

(G): a polyolefin-based resin, (H): a rubbery polymer wherein in tan δ—temperature-dependence curve obtained by measuring solid viscoelasticity of a composition prepared by kneading with (G), a new single tan δ peak is given at a temperature different from both of the tan δ peak temperature of (G) and the tan δ peak temperature of (H), in a temperature range from −70 to 30° C.

Also, the present invention relates to a multi-layer molded article in which a thermoplastic core material is laminated on the side of the layer (II) of the two-layer molded article, and a method for producing the same.

DETAILED DESCRIPTION OF THE INVENTION

The present invention will be illustrated in detail below.

The component (A) in the present invention is a polyolefin-based resin, and is at least one selected from homopolymers or copolymers of olefins having a high crystallinity. Examples of the olefin include ethylene and α-olefins having 3 to 8 carbon atoms such as propylene, 1-butene, 1-hexene, 1-octene and the like. Examples of (A) include polyethylene, polypropylene, poly(1-butene), copolymers of propylene with ethylene, and copolymers of propylene with another α-olefin (for example, 1-butene or the like). When (A) is a propylene-ethylene copolymer resin or a propylene-1-butene copolymer resin, the thermoplastic elastomer composition of the present invention is preferable because a molded article having an excellent heat-resistance and flexibility can be obtained.

The crystallinity of the resin(A) is required to 50% or more, and preferably 60% or more. Herein, the crystallinity means the ratio of the fusion heat of the resin(A) to the fusion heat of a crystalline polyolefin homopolymer composed solely of an olefin unit of which content by weight is the highest among olefins in the resin(A) used, and produced by using the same catalyst system under the same conditions (temperature, pressure, use amount of catalyst, and the like). The fusion heat is measured by a differential scanning calorimetry (DSC).

Further, there can also be used a copolymer obtained by copolymerization of two or more monomers selected from ethylene and α-olefins having 3 to 8 carbon atoms in two or more steps. For example, there can be used a copolymer obtained by homopolymerizing propylene in the first step, and copolymerizing propylene with ethylene or an α-olefin other than propylene in the second step to obtain a copolymer. From the viewpoint of the strength of a molded article obtained by a powder molding method, the melt flow rate (hereinafter, referred to as "MFR") of (A) measured according to JIS K-7210 at a temperature of 230° C. under a load of 2.16 kg is usually from 20 to 500 g/10 min., preferably from 50 to 300 g/10 min., particularly preferably from 100 to 300 g/10 min.

The component (B) in the present invention is a hydrogenated diene-based copolymer satisfying all of the above-mentioned conditions ① to ⑦. Examples of the conjugated diene used for producing (B) include conjugated dienes having 4 to 8 carbon atoms such as 1,3-butadiene, isoprene, 1,3-pentadiene, 2,3-dimethyl-1,3-butadiene, 2-methyl-1,3-pentadiene and the like. Among them, 1,3-butadiene and isoprene are preferable in that they can be easily utilized industrially, and a hydrogenated diene-based copolymer having excellent physical property is obtained.

The vinyl aromatic compound may be substituted at 1- or 2-position of the vinyl group by an alkyl group such as a methyl group or the like. Examples of the vinyl aromatic compound include vinyl aromatic compounds having 8 to 12 carbon atoms such as styrene, p-methylstyrene, α-methylstyrene, t-butylstyrene, divinylbenzene, vinylpydirine and the like. Among them, styrene is preferably used from the industrial standpoint.

(B) usually has a constitution represented by the general formula $[(a)-(b)]_n$, $[(a)-(b)]_n-(a)$ or $[(b)-(a)]_n-(b)$ (wherein, n is an integer of 1 or more, when repeating units (a) and (b) are present in plural number, a plurality of (a)s and (b)s may be the same or different, respectively, and b is b1, b2 or b3. Among them, hydrogenated diene-based copolymers represented by (a)–(b1)–(a), (a)–(b2)–(a) and (a)–(b3)–(a) are preferable since they are easily produced industrially. A hydrogenated compound of a styrene-butadiene·styrene-styrene copolymer, a hydrogenated compound of a styrene-butadiene-styrene copolymer, a hydrogenated compound of a styrene-isoprene·styrene-styrene copolymer, and a hydrogenated compound of a styrene-butadiene-styrene copolymer are preferable since they are easily produced industrially. Particularly, a hydrogenated compound of a styrene-butadiene-styrene copolymer is preferable in that the resulted molded article has excellent strength and impact resistance at low temperature, and the strength of the resulted molded article is scarcely influenced even if there is industrial delicate variation in the ratio (V: percentage) of the number of hydrogenated conjugated diene units having a side chain of two or more carbon atoms to the total number of hydrogenated conjugated dienes in a hydrogenated diene-based copolymer described below. Herein, "–" indicates the border line between blocks, and "·" indicates that two or more compounds are used together in one block.

The total content of vinyl aromatic compound units in (B) is required to be in a range from 10 to 18% by weight (condition ②), and preferably from 12 to 17% by weight. When the total content of vinyl aromatic compound units is over 18% by weight, a molded article obtained by molding the thermoplastic elastomer composition tends to become hard. Whereas, when the total content of vinyl aromatic compound units is less than 10% by weight, there is a problem that the resulted molded article has a stickiness. The total content of vinyl aromatic compound units is determined by measuring $^1$H-NMR at a frequency of 90 MHz or more using a solution of (B) in carbon tetrachloride or the like.

The ratio (S: percentage) of the content of the vinyl aromatic compound unit of the vinyl aromatic compound polymer block (a) to the total content of vinyl aromatic compound units in (B) is required to 3% or more, and preferably from 30 to 100%, further preferably from 50 to 100%. When the ratio is less than 3%, there is a problem that the resulted molded article has a stickiness. This ratio is determined by measuring $^1$H-NMR at a frequency of 90 MHz or more using a solution of (B) in carbon tetrachloride or the like.

The ratio (V: percentage) of the number of hydrogenated conjugated diene units having a side chain of two or more carbon atoms to the total number of hydrogenated conjugated diene units in the conjugated diene-based copolymer in (B) is required to be 60% or more (condition ④), and preferably from 60 to 85%, further preferably from 65 to 80%. When the ratio is less than 60%, the resulted molded article becomes hard. In the case of 60 to 85%, when the heat-resistance of a molded article is evaluated, the change of the surface condition (gloss generation condition) can be strictly suppressed. This ratio can be measured by Morero method using infrared analysis.

It is necessary that the total content (T: weight percentage) of vinyl aromatic compound units, the ratio (S: percentage) of the content of the vinyl aromatic compound unit of the vinyl aromatic compound polymer block (a) to the total content of vinyl aromatic compound units, and the ratio (V: percentage) of the number of hydrogenated conjugated diene units having a side chain of two or more carbon atoms to the total number of hydrogenated conjugated diene units in the conjugated diene-based copolymer, in (B), satisfy the following formula (1) (condition ⑤):

$$V \leq 0.375 \times S + 1.25 \times T + 40 \quad (1)$$

If the above-described expression (1) is not satisfied, there is a problem that when the resulted molded article is heated at temperatures from about 80° C. and less than the melting point of a polyolefin-based resin, the molded article generates gloss.

It is necessary that 80% or more of double bonds of in conjugated diene units in (B) are hydrogenated (condition ⑥), and this hydrogenation ratio is preferably 90% or more, particularly preferably 96% or more. When the hydrogenation ratio is less than 80%, there is a problem that the light resistance of the resulted molded article becomes inferior.

It is necessary that the number-average molecular weight of (B) is from 50000 to 400000 (condition ⑦) for obtaining a molded article having excellent appearance and strength, and the number-average molecular weight is preferably from 100000 to 300000. When the number-average molecular weight is less than 50000, the resulted molded article manifests generation of stickiness, and additionally, thermal resistance and light resistance become insufficient. When the number-average molecular weight is over 400000, the melting property of the thermoplastic elastomer composition of the present invention is poor, and resultantly, a molded article having a good appearance and sufficient strength can not be obtained. The number-average molecular weight is measured by a GPC method.

It is preferable that MFR of (B) measured according to JIS K-7210 at a temperature of 230° C. under a load of 2.16 kg is from 1 to 200 g/10 min., further from 5 to 100 g/10 min., since a molded article having a good appearance and sufficient strength can be obtained.

(B) used in the present invention may be modified with a functional group, and alternatively, there may be used a functional group-modified product thereof having at least one functional group selected from acid anhydride group, carboxyl group, hydroxyl group, amino group, isocyanate group and epoxy group. When these groups are used, there can be obtained a merit of improvement of adhesive property when the resulted molded article is adhered to a polyurethane foamed layer to produced a two-layer molded article or multi-layer molded article, for example.

Such a hydrogenated diene-based copolymer can be produced by methods described in JP-A-3-72512, JP-A-5-271325, JP-A-5-217327, JP-A-6-287365 and the like, for example.

The thermoplastic elastomer composition for powder molding of the present invention may also contain (C) an ethylene-α-olefin-based copolymer, in addition to the essential components (A) and (B). If (C) is contained, a thermoplastic elastomer composition for powder molding which does not generate gloss when heated at temperatures from about 80° C. to less than the melting point of a polyolefin-based resin, and further, which has an excellent impact resistance at low temperature, is provided, without lowering the powder molding property of a thermoplastic elastomer powder, and without lowering the whitening resistance of bent portion when a molded article obtained by powder-molding the powder is bent.

The ethylene-α-olefin-based copolymer (C) is a copolymer of ethylene and α-olefin, a copolymer of ethylene, α-olefin and non-conjugated diene, or the like, which has scarce crystallinity or a crystallinity of less than 50%. Herein, the crystallinity means the ratio of the fusion heat of the copolymer to the fusion heat of a polyethylene homopolymer produced by using the same catalyst system under the same conditions (temperature, pressure, used amount of catalyst, and the like). The fusion heat is measured by a DSC method. Examples of the α-olefin include α-olefins having 3 to 10 carbon atoms such as propylene, 1-butene, 3-methyl-1-butene and the like, and examples of the non-conjugated diene include non-conjugated dienes having 5 to 15 carbon atoms such as dicyclopentadiene, 5-ethylidine-2-norbornene, 1,4-hexadiene, 1,5-cyclooctadiene, 5-methylene-2-norbornene and the like. As the ethylene-α-olefin based copolymer, there are exemplified a ethylene-propylene copolymer, ethylene-1-butene copolymer, ethylene-1-hexene copolymer, ethylene-1-octene copolymer, ethylene-propylene-5-ethylidene-2-norbornene copolymer (hereinafter, referred to as "EPDM") and the like. Such an ethylene-α-olefin based copolymer may be crosslinked.

The α-olefin unit content in (C) is preferably from 5 to 40% by weight, preferably from 10 to 35% by weight, and the ethylene unit content is usually from 60 to 95% by weight, preferably from 65 to 90% by weight. The α-olefin unit content and ethylene unit content can be measured by a $^{13}$C-NMR method, infrared absorption analysis method or the like. The Mooney viscosity measured at 100° C. {$ML_{1+4}(100°\text{ C.})$} according to ASTM D-927-57T of this ethylene-α-olefin based copolymer is preferably from 10 to 350, more preferably from 15 to 300, from the viewpoint of the strength of a molded article obtained by powder-molding the thermoplastic elastomer composition for powder molding of the present invention.

When (C) is used, the amount of (C) is 250 parts by weight or less, preferably from 20 to 200 parts by weight based on 100 parts by weight of (A). When the amount of (C) is too large, stickiness may occur on the molded article obtained by the powder molding method.

Further, the thermoplastic elastomer composition for powder molding of the present invention may contain a styrene-based thermoplastic elastomer other than the above-mentioned (B) as a component (D), in addition to the essential components (A) and (B). As the component (D), there are exemplified hydrogenated diene-based copolymers containing the same structural units (a) and (b) as in (B), hydrogenated compounds of vinyl aromatic compound-conjugated diene random copolymers, and the like. As the hydrogenated diene-based copolymer containing the same structural units (a) and (b) as in (B) which is an example (D), there are listed hydrogenated diene-based copolymers which do not satisfy at least one of the conditions ② to ⑦ as specified in (B).

For example, when hydrogenated diene-based copolymers which does not satisfy the condition ⑤ and satisfy the conditions ① to ④ and ⑥ to ⑦ are used (the following relation was satisfied: $V>0.375\times S+1.25\times T+40$), a thermoplastic elastomer composition for powder molding having more excellent scratch resistance can be obtained.

When a hydrogenated diene-based copolymer which does not satisfy the condition ④ is used (a hydrogenated diene-based copolymer in which the ratio (V: percentage) of the number of hydrogenated conjugated diene units having a side chain of two or more carbon atoms to the total number of hydrogenated conjugated diene units in the hydrogenated diene-based copolymer is less than 60% is used), a thermoplastic elastomer composition for powder molding having more excellent impact resistance at low temperature can be obtained.

When (D) is used, the amount of (D) is 250 parts by weight or less, preferably from 20 to 200 parts by weight based on 100 parts by weight of (A). When the amount of (D) is too large, there occurs, for example, a demerit that stickiness may occur on the resulted molded article.

The thermoplastic elastomer composition for powder molding of the present invention may contain, if necessary, polymer components (E) other than the above-mentioned components (A) to (D), such as hydrogenated products of conjugated diene polymers, rubbery polymers such as natural rubber, butyl rubber, chloroprene rubber, epichlorohydrin rubber, acrylic rubber and the like, ethylene-acrylic acid copolymer, ethylene-vinyl acetate copolymer and saponified products thereof, ethylene-methyl methacrylate copolymer, ethylene-glycidyl acrylate-vinyl acetate copolymer, ethylene-glycidyl methacrylate-vinyl acetate copolymer and the like. Among them, hydrogenated products of conjugated diene polymers are preferable.

As the hydrogenated product of a conjugated diene polymer rubber, there are listed hydrogenated polybutadiene, hydrogenated polyisoprene, and the like. The ratio (V: percentage) of the number of hydrogenated conjugated diene units having a side chain of two or more carbon atoms to the total number of hydrogenated conjugated diene units in the hydrogenated diene-based copolymer is preferably over 60% from the standpoint of the flexibility of a molded article obtained by powder molding, and the hydrogenated compound of a conjugated diene polymer may be constituted of two or more blocks having different (V)s. As the hydrogenated diene polymer, polymers described in JP-A-3-74409, CEBC6200 manufactured by JSR Corporation, and the like are listed. When (E) is contained in the thermoplastic elastomer composition of the present invention, the strength of the resulted molded article increases particularly when the thermoplastic elastomer composition contains (C).

When the hydrogenated product of the conjugated diene polymer is used, the amount thereof is 250 parts by weight or less, preferably from 20 to 200 parts by weight based on 100 parts by weight of (A). When the amount of (C) is too large, stickiness may occur on the molded article obtained by the powder molding method.

The thermoplastic elastomer composition for powder molding of the present invention may contain various additives, such as, for example, mineral oil-based softening agents, thermal stabilizers(e.g. phenol-based thermal stabilizer, sulfite-based thermal stabilizer, phenylalkane-based thermal stabilizer, phosphite-based thermal stabilizer, amino-based thermal stabilizer, amide-based thermal stabilizer), weathering stabilizers, antistatic agents, pigments, lubricants (e.g. metal soap, wax), antifungus agents, antimicrobial agents, fillers and the like.

When the thermoplastic elastomer composition for powder molding of the present invention contains a mineral-based softening agent, there can be obtained a thermoplastic elastomer composition powder excellent in melting property and a powder-molded article excellent in flexibility.

When the thermoplastic elastomer composition for powder molding of the present invention contains a pigment, a molded article which is not easily decolored by wiping with an organic solvent such as hexane, benzine, toluene or the like, can be obtained. As the pigment, there can be used organic pigments such as azo pigments, phthalocyanine pigments and threne pigments, and dyeing lakes and the like; and inorganic pigments such as oxides such as titanium oxide and the like, chromic acid molybdic acid-based pigments, selenium sulfide compound, ferrocyan compound, carbon black and the like.

As the pigment, any of liquid compounds and powdery compounds can be used. When a pigment in the form of powder is used, the primary particle size is preferably 300 nm or less from the standpoint of uniform coloration. Further, when a pigment in the form of powder is used, those supported on carriers such as calcium carbonate, metal soap, magnesium oxide or the like can also be used. In this case, the primary particle size of the carrier is usually 10 μm or less, preferably from 1 to 5 μm. In this case, the weight ratio of the powder pigment to the carrier is usually from 20:80 to 80:20, preferably from 25:75 to 75:25.

The thermoplastic elastomer composition for powder molding of the present invention contains the above-mentioned (A) and (B) as essential components, and if necessary, at least one of (C) and (D). The amount of (B) is required to from 10 to 1000 parts by weight, preferably from 40 to 200 parts by weight based on 100 parts by weight of (A). When the amount of (B) based on 100 parts by weight of (A) is less than 10 parts by weight, a molded article obtained by powder molding is inferior in flexibility, and when a molded article is bent, the bent portion tends to be whitened, whereas, when over 1000 parts by weight, stickiness occurs on a molded article obtained by powder molding, and thermal resistance and light resistance become insufficient.

Further, when powder obtained by mechanical pulverization described below of the thermoplastic elastomer composition for powder molding of the present invention is powder-molded, the complex dynamic viscosity $\eta^*(1)$ at 250° C. of the composition is required to $1.5 \times 10^5$ poise or less, preferably from $1 \times 10^2$ to $8 \times 10^4$, further preferably from $3 \times 10^2$ to $5 \times 10^4$, particularly preferably from $3 \times 10^2$ to $1 \times 10^4$. Herein, the complex dynamic viscosity $\eta^*(\omega)$ is a value calculated according to the following calculation equation (2) at a temperature of 250° C. using the storage modulus $G'(\omega)$ and the loss modulus $G''(\omega)$ at a vibration frequency of $\omega$, and the complex dynamic viscosity $\eta^*(1)$ is a complex dynamic viscosity when $\omega$ is 1 radian/second.

$$\eta^*(\omega) = \{[G'(\omega)]^2 + [G''(\omega)]^2\}^{1/2}/\omega \quad (2)$$

When $\eta^*(1)$ is over the above-mentioned upper limit, there is a tendency that the melt flowability of the thermoplastic elastomer composition is poor, and it becomes difficult to produce a molded article by a molding method such as a powder molding method in which the shear rate in the molding is usually as low as 1 second$^{-1}$ or less.

When the powder obtained by mechanical pulverization described below of the thermoplastic elastomer composition for powder molding of the present invention is powder-molded, the Newtonian viscosity index n is required to 0.67 or less, and preferably from 0.01 to 0.35, further preferably from 0.03 to 0.25. Herein, the Newtonian viscosity index n is a value calculated according to the following calculation equation (3) using the above-mentioned complex dynamic viscosity $\eta^*(1)$ and a complex dynamic viscosity $\eta^*(100)$ measured at a temperature of 250° C. and a vibration frequency of $\omega=100$ radian/second.

$$n = \{\log \eta^*(1) - \log \eta^*(100)\}/2 \quad (3)$$

When the Newtonian viscosity index n is over the above-mentioned upper limit, the mechanical strength of the resulted molded article lowers.

When powder obtained by a strand cut method, die face cut method or solvent treating method described below from the thermoplastic elastomer composition for powder molding of the present invention is powder-molded, the complex dynamic viscosity $\eta^*(1)$ at 250° C. of the composition is preferably from $1 \times 10^2$ to $5 \times 10^4$, further preferably from $3 \times 10^2$ to $8 \times 10^3$. In this case, Newtonian viscosity index n is required to 0.28 or less, and preferably from 0.01 to 0.20, further preferably from 0.03 to 0.15.

As the method for obtaining the thermoplastic elastomer composition of the present invention, there are listed the following methods, for example. Namely, (A) and (B) and at least one of (C) and (D) compounded if necessary may advantageously melt-kneaded. Further, the thermoplastic elastomer composition can also be produced by selecting all or several kinds of the above-mentioned components, and kneading or dynamically crosslinking them, then, melt-kneading components which have not been selected. For example, a thermoplastic elastomer composition of the present invention which contains (A), (B), (C) and (D) and in which (A) and/or (C) are crosslinked intramolecularly and/or intermolecularly, can usually be produced by dynamically crosslinking (A) and (C), then, further adding (B) and (D) and kneading them. Herein, in the kneading, a single screw extruder, a twin screw extruder, kneader, rolls or the like can be used. The compounding of the above-mentioned various additives and various polymers can be conducted, for example, by using (A), (B), (C) or (D) into which these additives have been previously compounded, or compounding them in kneading or dynamic crosslinking the above-mentioned components.

The dynamic crosslinking of the above-mentioned kneading mixture can be conducted by, for example, kneading the above-mentioned kneading mixture and a crosslinking agent under heating. As the crosslinking agent, there are usually used organic peroxides such as 2,5-dimethyl-2,5-di(tert-butyl peroxyno)hexane, dicumyl peroxide and the like. The crosslinking agent is used in an amount of usually 1 part by weight or less, preferably from 0.1 to 0.8 parts by weight, more preferably from 0.2 to 0.6 parts by weight based on 100 parts of the total amount of (A) and (B) and at least one of (C) and (D) compounded if necessary.

When an organic peroxide is used as the crosslinking agent, if dynamic crosslinking is conducted in the presence of a crosslinking aid such as a bismaleimide compound or the like, a thermoplastic elastomer composition for powder molding which gives a molded article having an excellent heat resistance, can be obtained. In this case, the use amount of the organic peroxide is usually 0.8 parts by weight or less, preferably from 0.2 to 0.8 parts by weight, more preferably from 0.4 to 0.6 parts by weight based on 100 parts of the total amount of (A), (B) and at least component of (C) and (D) optionally compounded, to be crosslinked.

The used amount of the crosslinking aid is usually 1.5 parts by weight or less, preferably from 0.2 to 1 part by weight, more preferably from 0.4 to 0.8 parts by weight based on 100 parts of the total amount of (A), (B) and at least one of (C) and (D) compounded if necessary. The crosslinking aid is preferably compounded before addition of the crosslinking agent, and usually added in pre-kneading the above-mentioned components to be crosslinked.

The crosslinking of (A), (B) and at least one of (C) and (D) optionally compounded can be conducted by kneading components to be crosslinked among them, a crosslinking agent and if necessary, a further crosslinking aid by using a single screw kneader or a twin screw kneader while heating at a range from 150 to 250° C. Further, the crosslinking can also be conducted by a sulfur crosslinking or the like.

These additives and other polymer components may be previously contained in at least one of (A), (B) and (C) and (D) optionally compounded, or may be compounded by kneading or the like in the above-described kneading and dynamic crosslinking, or thereafter. When a mineral-based softening agent is used, if an oil-extended ethylene-$\alpha$-olefin-based copolymer prepared by previously adding the mineral-based softening agent into (C) is used, the above-mentioned kneading and dynamic crosslinking can be conducted easily.

For producing the thermoplastic elastomer composition for powder molding of the present invention which satisfies the physical values represented by the above-described complex dynamic viscosity and Newtonian viscosity index, the extent of the above-mentioned kneading and dynamic crosslinking, kinds and use amounts of components constituting the thermoplastic elastomer composition, kinds and use amounts of a crosslinking agent and crosslinking aid in dynamic crosslinking, kinds and used amounts of additives and the like are selected appropriately. Among them, the shear rates of kneading and dynamic crosslinking have large influence on the above-mentioned physical values, and it is preferable to conduct kneading and crosslinking at a shear rate of $1 \times 10^3$/second or more.

A powder of the thermoplastic elastomer composition for powder molding of the present invention can be produced by a method in which a thermoplastic elastomer composition obtained by the above-mentioned method is mechanically ground, or a strand cut method, die face cut method or solvent treating method.

As the method for pulverizing mechanically the thermoplastic elastomer composition for powder molding of the present invention, there are listed a freeze pulverizing method and normal temperature pulverizing method. The freeze pulverizing method is a method in which the thermoplastic elastomer composition for powder molding is cooled to the glass transition temperature thereof or lower, preferably −70° C. or lower, further preferably −90° C. or lower, and pulverization is conducted while keeping the frozen condition. Although the thermoplastic elastomer composition for powder molding can be ground at a temperature higher than the glass transition temperature thereof (normal temperature pulverization), in this case, there is a tendency that the particle size of the resulted ground substance becomes non-uniform, and the powder molding becomes difficult.

For conducting pulverization while keeping the cooled condition of the thermoplastic elastomer composition for powder molding, the pulverization is preferably conducted by a method showing excellent pulverization efficiency and generating small amount of heat, and for example, a mechanical pulverization method using an impact type grinder such as a ball mill or the like is used. As powder of a thermoplastic elastomer composition obtained in the above-method, it usually has a size passing through Tyler standard sieve 24 mesh (opening: 700 $\mu$m×700 $\mu$m), preferably has a size passing through 28 mesh (opening: 590 $\mu$m×590 $\mu$m), further preferably has a size passing through 32 mesh (opening: 500 $\mu$m×500 $\mu$m), particularly preferably has a size passing through 42 mesh (opening: 355 $\mu$m×355 $\mu$m).

The powder of the thermoplastic elastomer composition for powder molding of the present invention obtained by the above-mentioned pulverization method is not uniform in particle shape, therefore, the powder flowability thereof can be improved by coating a fine powder (F) on the surface thereof. As the fine powder (F), a fine powder having a primary particle size of 10 $\mu$m or less is used. Examples of the fine powder (F) include inorganic oxides, vinyl chloride resins for paste, metal salts of fatty acids, calcium carbonate, powder pigments (providing when a pigment is contained in a thermoplastic elastomer composition, it is preferable that the color is the same as that of the pigment) and the like. The primary particle size of the fine powder (F) is required to 10 $\mu$m or less, preferably 5 $\mu$m or less, further preferably from 5 nm to 5 $\mu$m. The primary particle size is a value obtained by photographing a fine powder by transmission electron microscope (TEM), selecting about 1000 particles at random and measuring the diameter of the particle, and dividing the sum of the diameter of these particles by the number of the particles.

As the inorganic oxide, alumina, silica, alumina silica, calcium carbonate and the like are listed. Alumina is a fine powder most of which is constituted of a unit of the chemical formula $Al_2O_3$. Alumina has various crystal forms, and any of crystal forms can be used. These are called α-alumina, β-alumina, γ-alumina and the like depending on the crystal form. There are listed Alumina C (γ-alumina) manufactured by Degusa limited, AKP-G008 (α-alumina) manufactured by Sumitomo Chemical Co., Ltd., and the like.

Silica is a fine powder most of which is constituted of a unit of the chemical formula $SiO_2$. Silica is produced by pulverizing natural diatomaceous earth, decomposition of sodium silicate, and the like. There are listed OX50 of Degusa limited, and the like. Alumina silica is an inorganic oxide containing the above-mentioned alumina and silica as main components.

The inorganic oxide may be coated with dimethyl silicone oil or the like, or may be surface-treated with a trimethylsilyl group or the like.

As the powder pigment, there can be used organic pigments such as azo pigments, phthalocyanine pigments and threne pigments, and dyeing lakes and the like; and inorganic pigments such as oxide pigments such as titanium oxide and the like, chromic acid molybdic acid-based pigments, selenium sulfide compound, ferrocyan compound, carbon black and the like.

Preferably, the fine powders (F) are used alone, or two or more of those having a primary particle size of 10 $\mu$m or less are combined for use. For example, the inorganic oxide can be used alone, or the powder pigment and inorganic oxide can be combined for use. A powder having a primary particle size of 300 nm or less and a powder having a primary particle size of 300 nm to 10 $\mu$m are combined and used as the fine powder (F), a powder of a thermoplastic elastomer composition for powder molding having further excellent bulk specific gravity (packing property) and coagulation resistance can be obtained as compared with single use of the fine powder.

When a powder pigment is used, those supported on carriers such as calcium carbonate, a metal soap, magnesium oxide and the like can also be used. In this case, the primary particle size of the carrier is usually 10 $\mu$m or less, preferably from 1 to 5 $\mu$m. In this case, the ratio by weight of the powder pigment to the carrier is usually from 20:80 to 80:20, preferably from 25:75 to 75:25.

The addition amount of the fine powder (F) is from 0.1 to 10 parts by weight, preferably from 0.2 to 8 parts by weight based on 100 parts by weight of the powder of the thermoplastic elastomer composition for powder molding obtained by the pulverization method. When the addition amount is less than 0.1 part by weight, good powder flowability and powder molding property are not obtained. When over 10 parts by weight, there is a tendency that the resulted molded article has poor strength since heat fusion between powders of the thermoplastic elastomer composition for powder molding decreases.

The method for compounding the fine powder (F) into the powder of the thermoplastic elastomer composition for powder molding is not particularly restricted, providing the fine powder is uniformly adhered onto the powder of the thermoplastic elastomer composition. For example, a method in which blending is conducted using a blender equipped with a jacket, a high speed rotation mixer, or the like is used. Among them, a method for preventing mutual adhesion of powders and for dispersing uniformly them by applying shearing force such as by a Henschel mixer, super mixer or the like is preferable. The compounding is usually conducted at room temperature.

The powder of the thermoplastic elastomer composition for powder molding of the present invention can be produced also by the following methods. In this case, though a powder having an excellent powder flowability can be obtained even if the above-mentioned fine powder (F) is not added, powder flowability can be further improved when the fine powder (F) is added.

Solvent treating method: A thermoplastic elastomer composition is cooled to the glass transition temperature or less (usually −70° C. or less, preferably −90° C. or less), and ground.

Then, powder of the thermoplastic elastomer composition produced by the above-mentioned freeze pulverization method is stirred in a solvent which has poor compatibility with the thermoplastic elastomer composition in the presence of a dispersing agent and an emulsifier at a temperature of not less than the melting temperature of the thermoplastic elastomer composition, preferably at a temperature higher than the melting temperature by 30 to 50° C., then, cooled (see, for example, JP-A No. 62-280226). In the solvent treating method, ethylene glycol, polyethylene glycol, polypropylene glycol or the like, for example, is used as the solvent, in an amount of usually from 300 to 1000 parts by weight, preferably from 400 to 800 parts by weight based on 100 parts by weight of the thermoplastic elastomer composition. As the dispersing agent, an ethylene-acrylic acid copolymer, silicic acid anhydride, titanium oxide or the like, for example, is used in an amount of usually from 5 to 20 parts by weight, preferably from 10 to 15 parts by weight based on 100 parts by weight of the thermoplastic elastomer composition. As the emulsifier, polyoxyethylenesorbitan mono-laurate, polyethylene glycol mono-laurate, sorbitan tri-stearate or the like is used in an amount of usually from 3 to 15 parts by weight, preferably from 5 to 10 parts by weight based on 100 parts by weight of the thermoplastic elastomer composition.

Strand cut method: A melted thermoplastic elastomer composition is extruded through a dice into air to obtain a strand, and this is cooled and cut (see, for example, JP-A No. 50-149747).

In the above-mentioned strand cut method, a die opening has a diameter of usually from 0.1 to 3 mm, preferably from 0.2 to 2 mm. The discharging amount of the thermoplastic elastomer composition per one die opening of the die is usually from 0.1 to 5 kg/hr, preferably from 0.5 to 3 kg/hr. The haul-off rate of a strand is usually from 1 to 100 m/min., preferably from 5 to 50 m/min. The cooled strand is cut into usually 1.4 mm or less, preferably 0.3 to 1.2 mm.

Die face cut method: A melted thermoplastic elastomer composition is cut while being extruded through a die into water. In the die face cut method, a die opening has a diameter of usually from 0.1 to 3 mm, preferably from 0.2 to 2 mm. The discharged amount of the thermoplastic elastomer composition per one die opening of the die is usually from 0.1 to 5 kg/hr, preferably from 0.5 to 3 kg/hr. The temperature of water is usually from 30 to 70° C., preferably from 40 to 60° C.

The powder of the thermoplastic elastomer composition for powder molding can be applied to various powder molding methods such as a powder slush molding, flow impregnation, static coating, powder thermal spraying, powder rotation molding and the like. For example, the powder slush molding is conducted as follows.

First step: A step in which a fluorine and/or silicon-based release agent is coated on the molding surface of a mold.

When the powder of the thermoplastic elastomer composition of the present invention is powder-molded and the molded article is removed from a mold in the sixth step, the resultant molded article may be broken if the molded article is tried to be forcibly removed due to strong adhesion with the inner surface of the mold. Therefore, though not essential, it is preferable to coat the inner surface of the mold with a spray of a silicone-based release agent, fluorine-based release agent or the like. As the silicone-based release agent, there are exemplified KF96SP (organic solvent-diluted product) manufactured by Shin-Etsu Silicone K. K., and the like, and as the fluorine-based release agent, there are exemplified Daifree GA-6010 (organic solvent-diluted product) and ME-413 (water-diluted product) manufactured by Daikin Industries, Ltd., and the like.

Second step: A step in which a powder of a thermoplastic elastomer composition is fed on the molding surface of a mold heated to the melting temperature of the powder of a thermoplastic elastomer composition, or higher.

Powder of the thermoplastic elastomer composition is fed on the molding surface of a mold heated to the melting temperature of the composition, or higher, usually from 160 to 32° C., preferably from 210 to 300° C. In this method, the mold is heated by a gas heating furnace method, heat medium oil circulation method, a method of immersion into a heat medium oil or heat flow sand, high frequency induction heating method or the like. The heating time for heat fusion of a powder of a thermoplastic elastomer composition is appropriately selected depending on the size and thickness of the intended molded article and the like.

Third step: A step in which powder of the thermoplastic elastomer composition is heated for a predetermined time on the molding surface in the second step, and powder particles at least of which surfaces have been melted are adhered each other.

Forth step: A step in which after the given time has lapsed in the third step, powders which have not been fused are recovered.

Fifth step: A step in which, if necessary, the mold carrying the remaining melted powder of a thermoplastic elastomer composition is further heated.

Sixth step: A step in which, following the fifth step, the mold is cooled, and a molded article formed thereon is removed from the mold.

The mold is cooled, and a molded article formed thereon is removed from the mold. Further, in producing the thermoplastic elastomer composition for powder molding, if the above-mentioned lubricant is internally added, there occurs such an effect that a load required for removing the molded article in the sixth step described before is reduced. In this case, the above-mentioned first step can also be omitted. The addition amount of a lubricant is usually 5 parts by weight or less, preferably from 0.1 to 2 parts by weight based on 100 parts by weight of a thermoplastic elastomer composition. When the addition amount of a lubricant is over 5 parts by weight, there may occur problems that the strength of the resulted molded article decreases, the mold surface is stained, and the like.

A foamed molded article can be produced by powder-molding the powder of the thermoplastic elastomer composition of the present invention containing a foaming agent, and then foaming the powder-molded article. The foaming agent may be previously contained in the powder of the thermoplastic elastomer composition, or may be coated on the surface of the powder of the thermoplastic elastomer composition by a rotary mixer such as the above-mentioned Henschel mixer or the like. The foaming agent can also be compounded simultaneously with the above-mentioned fine powder. As the foaming agent, a thermal decomposition type foaming agent is usually used. Examples of the thermal decomposition type foaming agent include azo compounds such as azodicarboneamide, 2,2'-azobisisobutyronitrile, diazodiaminobenzene and the like, sulfonylhydrazide compounds such as benzenesulfonylhydrazide, benzene-1,3-sulfonylhydrazide, p-toluenesulfonylhydrazide and the like, nitroso compounds such as N,N'-dinitrosopentamethylenetetramine, N,N'-dinitroso-N,N'-dimethylterephthalamide and the like, azide compounds such as terephthalazide and the like, carbonates such as sodium bicarbonate, ammonium bicarbonate, ammonium carbonate and the like. Among other, azodicarboneamide is preferably used. The compounding of a foaming agent is usually conducted at a temperature less than the decomposition temperature of the foaming agent. The powder of the thermoplastic elastomer composition for powder molding of the present invention may also contain a foaming aid and a cell adjuster together with a foaming agent.

A molded article obtained by molding the powder of the thermoplastic elastomer composition of the present invention is useful as a skin material, and a two-layer molded article made by laminating a foamed layer on one surface of the molded article may also be used as a skin material. Such as two-layer molded article can be integrally produced by a power molding method (see, e.g. JP-A 5-473), and can also be produced by adhering a separately-produced foam onto the above-mentioned molded article with a bonding agent or the like.

For producing a two-layer molded article by a powder molding, it is recommendable that, for example, a mold which may have complicated patterns on the molding surface is heated to the melting temperature of powder of the thermoplastic elastomer composition, or higher, then, the above-described powder of the thermoplastic elastomer composition is fed on the molding surface of the above-mentioned mold, powder particles are allowed to be thermally fused each other to obtain a melted product in the form of a sheet on the molding surface, then, excess powder which has not been thermally fused is removed, then, a thermoplastic elastomer powder containing a foaming agent (both of a powder in which a fine powder is compounded and a powder not containing the fine powder can be used) is fed on this melted sheet, and powder particles are allowed to be thermally fused mutually to obtain a melted sheet on the above-mentioned molding surface, then, excess powder which has not been thermally fused is removed, then, further heated to cause foaming to form a foamed layer.

For example, production of a two-layer molded article by a powder slush molding is conducted as follows. A layer(I) is produced in the above-mentioned first to fifth steps, then, the following sixth or further steps are conducted to produce the two-layer molded article.

Sixth step: A step in which a powder of a thermoplastic elastomer composition constituting a layer(II) is further fed on the molding surface of a mold.

The feeding time for thermally fusing the powder is appropriately selected depending on the size, thickness and expansion ratio of the intended molded article, and the like.

Seventh step: A step in which a powder of a thermoplastic elastomer composition constituting the layer(II) on the molding surface in the sixth step is heated for a predetermined time, to cause mutual fusion of powder particles at least of which surfaces are melted.

Eighth step: A step in which, after the predetermined time in the seventh step has lapsed, powder which has not been fused is recovered.

Ninth step: A step in which, if necessary, the mold carrying the melted powder is further heated to cause foaming of the thermoplastic elastomer composition constituting the layer(II).

Tenth step: A step in which, after the ninth step, the mold is cooled, and a two-layer molded article is removed from the mold.

Further, it is also possible to form a composite molded article composed of a non-foamed layer/formed layer/non-foamed layer by a powder molding. In this case, the non-foamed layers may be the same or different.

As the foaming agent, the same thermal decomposition type foaming agents as described above are listed, and as the polymer components in a thermoplastic elastomer composition containing such a foaming agent, there are exemplified vinyl chloride-based resins, polyolefins, olefin-based thermoplastic elastomers, and the like. Further, as the thermoplastic polymer composition containing a foaming agent, a polyethylene-based foaming composition used in JP-A 7-228720 can also be used.

Into a powder of this polyethylene-based foaming composition, the fine powder used in the present invention may also be compounded.

Further, a polyurethane foam can also be used as the foamed layer. In this case, since the adhesion between the thermoplastic elastomer composition of the present invention and the polyurethane tends to inferior, the adhered surface of the molded article is pre-treated with a primer such as polyethylene chloride or the like to improve the adhesion.

The polyurethane foam is formed by fixing the above-mentioned molded article and a core material described below to given positions at a given interval, pouring a mixed solution of a polyol and a polyisocyanate into the clearance thereof, and allowing the mixture to foam under positive pressure.

Further, as the material of the thermoplastic elastomer composition foamed layer constituting the layer(II), a thermoplastic elastomer composition containing 100 parts by weight of the following (G) and 10 to 1000 parts by weight of the following (H) is preferably used, since the composition give a two-layer molded article having excellent moldability and cushioning property.

(G): Polyolefin-based resin (H): Rubbery polymer wherein in tan δ-temperature-dependence curve obtained by measuring solid viscoelasticity of a composition prepared by kneading with (G), a new single tan δ peak is given at a temperature different from both of the tan δ peak temperature of (G) and the tan δ peak temperature of (H), in a temperature range from −70 to 30° C.

As the above-mentioned polyolefin-based resin (G), the above-mentioned polyolefin-based resin (A) is used.

The above-mentioned rubbery polymer (H) is a rubbery polymer wherein in tan δ-temperature-dependence curve obtained by measuring solid viscoelasticity of a composition prepared by kneading with (G), a new single tan δ peak is given at a temperature different from both of the tan δ peak temperature of (G) and the tan δ peak temperature of (H), in a temperature range from −70 to 30° C. This behavior does not depend on the ratio by weight of the kneaded composition of (G) and (H).

As the component (H), conjugated diene-based rubbery polymers, hydrogenated conjugated diene-based rubbery polymers, and the like, are listed.

The conjugated diene-based rubbery polymer means a conjugated diene polymer rubber or conjugated diene-based copolymer rubber.

The conjugated diene polymer rubber is a polymer rubber which is obtained by polymerization or copolymerization of at least one of conjugated dienes. Examples of the conjugated diene include conjugated dienes having 4 to 8 carbon atoms such as 1,3-butadiene, isoprene(2-methyl-1,3-butadiene), 1,3-pentadiene, 2,3-dimethylbutadiene and the like. Among these, 1,3-butadiene and isoprene are preferable from view points of industrially easy utilization and obtaining of a conjugated diene polymer rubber of excellent physical properties.

Examples of the conjugated diene polymer include polybutadiene, polyisoprene, polypentadiene, butadiene-isoprene copolymer and the like.

The conjugated diene-based copolymer rubber is a copolymer rubber composed of a conjugated diene selected from the conjugated dienes as described above and a monomer other than the conjugated diene. Examples of the monomer other than the conjugated diene include vinyl aromatic compounds, vinylester compounds, ethylenically unsaturated carboxylic acid esters, vinylnitrile compounds and like, and among them, the vinyl aromatic compounds are preferable since they are easily utilized industrially such as easy pelletization of the resulted copolymer.

In the vinyl aromatic compound, 1- or 2-position of the vinyl group may be substituted with an alkyl group such as a methyl group and the like. Examples of the vinyl aromatic compound include vinyl aromatic compounds having 8 to 12 carbon atoms such as styrene, p-methylstyrene, α-methylstyrene, t-butylstyrene and the like. Among them, styrene is preferable in that it can be utilized most easily industrially.

As the vinyl ester compound, vinyl acetate and the like are exemplified.

As the ethylenically unsaturated carboxylic acid ester, methyl methacrylate, ethyl methacrylate, methyl acrylate, butyl acrylate and the like are exemplified.

As the vinylnitrile compound, acrylonitrile, methacrylonitrile and the like are exemplified.

Examples of the conjugated diene-based copolymer rubber include conjugated diene-vinyl aromatic compound copolymer rubbers such as a butadiene-styrene copolymer rubber, isoprene-styrene copolymer rubber, butadiene-p-methylstyrene copolymer rubber and the like, conjugated diene-vinyl ester compound copolymer rubbers such as a butadiene-vinyl acetate copolymer and the like, conjugated diene-ethylenically unsaturated carboxylic acid ester copolymer rubbers such as a butadiene-methacrylic acid copolymer rubber, butadiene-methyl acrylate copolymer rubber and the like, conjugated diene-vinylnitrile compound copolymer rubbers such as a butadiene-acrylonitrile copolymer and the like.

As the structure of such a conjugated diene-based copolymer rubber, there are listed random copolymers of a conjugated diene with a monomer other than the conjugated diene, block copolymers constituted of a block of a conjugated diene polymer and a block of a polymer composed of a monomer other than the conjugated diene, block copolymers constituted of a block of a conjugated diene polymer and a block of a copolymer of a conjugated diene and a monomer other than the conjugated diene, Among them, the block copolymer is preferably used from the standpoints of cushioning property and sticking resistance of the layer(II), and the like. The number of blocks constituting these block copolymers is 2 or more, and 2 to 4 is preferable in that the copolymer can be easily produced industrially.

The hydrogenated conjugated diene-based rubber is a hydrogenated conjugated diene polymer rubber or a hydrogenated conjugated diene-based copolymer rubber which is obtained by hydrogenation of the above-described conjugated diene polymer rubber or conjugated diene-based copolymer rubber, and as such a hydrogenated conjugated diene-based rubber, hydrogenated products of the above-mentioned conjugated diene-based rubbers are listed, and preferably 80% or more of double bonds in conjugated diene units are hydrogenated, and further preferably, 90% or more are hydrogenated. When the hydrogenation ratio is less than 80%, the light resistance of the layer (II) tends to decrease.

In the conjugated diene-based copolymer rubber or hydrogenated conjugated diene-based copolymer rubber, it is preferable that the content of monomer units other than conjugated dienes is usually 50% by weight or less, preferably 20% by weight or less, since a layer(II) having an excellent flexibility is obtained. When the content thereof is over 50% by weight, the flexibility of the layer(II) tends to decrease, and the cushioning property of a two-layer molder article tends to decrease.

When a hydrogenated conjugated diene-based rubber is used as the component (H), the ratio of the number of hydrogenated conjugated diene units having a side chain of two or more carbon atoms to the total number of hydrogenated conjugated diene units in the component (H) is required to 50% or more, preferably from 60 to 95%, further preferably from 70 to 90% from the standpoint of the cushioning feeling of the layer(II), though the ratio varies depending on the kind of the conjugated diene monomer used in the polymerization. This ratio can be obtained by Morero method using infrared spectrum analysis.

The melt flow rate (MFR) of (H) measured according to JIS K-7210 at a temperature of 230° C. and a load of 2.16 kgf is preferably from 0.1 to 200 g/10 min., further preferably from 1 to 100 g/10 min., particularly preferably from 3 to 80 g/10 min., since a layer(II) having a good appearance and a sufficient cushioning property can be obtained.

(H) used in the present invention may be modified with a functional group, and alternatively, there may also be used a functional group-modified product having at least one functional group selected from an acid anhydride group, carboxyl group, hydroxyl group, amino group, isocyanate group and epoxy group.

Such a rubbery polymer can be produced easily by the method described in, for example, JP-A-2-36244, 3-72512, 7-118335, 56-38338, 61-60739 or the like.

As (H), a propylene-1-butene-based copolymer rubber, propylene-α-olefin-ethylene-based copolymer rubber or the like can also be used.

The thermoplastic elastomer composition constituting the layer(II) of the present invention may also contain the following (J) and/or (K), in addition to the essential components (G) and (H).

(J): Rubbery polymer wherein in tan δ-temperature-dependence curve obtained by measuring solid viscoelasticity of a composition prepared by kneading with (G), two tan δ peaks are given in a temperature range from −70 to 30° C.

(K): Ethylene-α-olefin-based copolymer

Though (J) is constituted of the same monomer as described for (H), it is a rubbery polymer having low compatibility with (G).

As (K), the above-mentioned ethylene-α-olefin-based compound (C) is used.

When (J) and/or (K) is contained, the low temperature impact-resistance of the layer(II) can be improved without lowering the cushioning property of the layer(II).

When (J) and/or (K) is used, the amount of (J) and/or (K) is 250 parts by weight or less, preferably from 20 to 200 parts by weight based on 100 parts by weight of (G). When the amount of (J) and/or (K) is too large, the durability of the resulted layer (II) may decrease.

The thermoplastic elastomer composition constituting the layer(II) in the present invention may contain, if necessary, polymers such as a natural rubber, butyl rubber, chloroprene rubber, epichlorohydrin rubber, acrylic rubber and the like, and other polymer components such as an ethylene-acrylic acid copolymer, ethylene-vinyl acetate copolymer and saponified products thereof, ethylene-methyl methacrylate copolymer, ethylene-glycidyl acrylate-vinyl acetate copolymer, ethylene-glycidyl methacrylate-vinyl acetate copolymer and the like, likewise as the thermoplastic elastomer composition constituting the layer (I) described above.

The molded article or two-layer molded article as described above is preferably useful as a skin material to be laminated on a thermoplastic resin core material, and for example, the above-mentioned molded article can be used in a multi-layer molded article having on one surface thereof a thermoplastic resin core material laminated, and the two-layer molded article can be used in a multi-layer molded article having on its foamed layer side a thermoplastic resin core material laminated.

As the thermoplastic resin in the thermoplastic resin core material, for example, polyolefins such as polypropylene, polyethylene and the like, and thermoplastic resins such as ABS (acrylonitrile-butadiene-styrene copolymer) resin and the like are used. Among them, polyolefins such as polypropylene and the like are preferably used.

Such a multi-layer molded article can be produced easily by a method in which a thermoplastic resin melt is fed on one surface of the molded article, and pressed or a method in which a thermoplastic resin melt is fed the foamed layer side of the two-layer molded article, and pressed.

The thermoplastic resin melt means a thermoplastic resin in the molten state by being heated to its melt temperature or higher. The thermoplastic resin melt may be fed before the pressing, or simultaneous with the pressing. Further, the pressing may be conducted using a mold or the like, or may also be conducted by feeding pressure of the thermoplastic resin melt. As such a molding method, there are exemplified an injection molding, low pressure injection molding, low pressure compression molding and the like.

Specifically, for example, in case of using the above-mentioned molded article as the skin material, the molded article is fed between a pair of opened molds, then, the molds are clamped after or while feeding a thermoplastic resin melt between one surface of the molded article and one mold which is opposite to the surface, and in case of using the above-mentioned two-layer molded article as the skin material, the two-layer molded article is fed between a pair of opened molds, then, the molds are clamped after or while feeding a thermoplastic resin melt between the foamed layer of the molded article and one mold which is opposite to the foamed layer. The opening and closing direction of the molds is not particularly restricted, and both of the vertical direction and horizontal direction may be permissible.

When the above-mentioned molded article or two-layer molded article produced by using a powder molding mold is used as a skin material, this mold for powder molding can be used as one of the molds in producing the above-mentioned multi-layer molded article, while holding the molded article or two-layer molded article on the molding surface of the mold for powder molding. According to this method, the intended multi-layer molded article can be obtained with scarcely damaging patterns formed on the surface, since the molded article or two-layer molded article to which patterns on the mold have been transferred is fed between molds without being separated from the mold.

Though the thermoplastic resin melt may be fed after completion of clamping of both molds, it is preferable to clamp both molds while or after feeding the melt when the molds are not closed, since there is little shift of the molded article or two-layer molded article which is a skin material, and a multi-layer molded article having also improved degree of transfer of patterns. The method for feeding a thermoplastic resin melt is not particularly restricted, and for example, it can be fed through a resin passage provided in one of molds facing the molded article or two-layer molded article. Alternatively, it is allowable that a feeding nose of the resin melt is inserted between molds and the resin melt is fed, then, the feeding nose is removed out of the system to close the both molds.

As a pair of molds, a pair of male/female molds in which the outer peripheral surface of the one mold and the inner peripheral surface of the other mold are capable of sliding each other can also be used. In this case, by setting a clearance in sliding surfaces between the molds to almost the same value as that of a thickness of the molded article or two-layer molded article, a multi-layer molded article having a marginal portion of the skin material around the article edges can be obtained, and a multi-layer molded article whose edges portions are covered with the skin material layer can be obtained by folding back the marginal portion of the skin material onto the back side of the multi-layer molded article.

Furthermore, it is also possible to produce a multi-layer molded article by putting a barrier layer on the layer (II)(foamed layer side) of the fore-mentioned two-layer molded article composed of the layers (I) and (II), feeding a thermoplastic resin melt on the barrier layer and pressing. The multi-layer molded article produced by this method shows better softness and touch-feeling because the barrier layer protects the deterioration of cells in the foamed layer from heat and pressure.

Herein, the thickness of the barrier layer is particularly limited, but preferably 0.5 to 3 mm, more preferably 0.7 to 2 mm. The barrier layer is usually used as a flat sheet, or a pre-formed one produced by vacuum molding, extrusion molding or the like. As a material of the barrier, there are listed olefin resins such as polyethylene, polypropylene, olefin-based thermoplastic elastomer, and the like.

Further, in the molded article, two-layer molded article and multi-layer molded article of the present invention, by coating the surface of the thermoplastic elastomer molded article side obtained by powder molding of the powder of the thermoplastic elastomer composition of the present invention, with a paint, the scratch-resistance and friction-resistance of the molded article can also be improved. As the paint, known urethane-based paints, acrylic paints, as well as other paints can be used.

EXAMPLE

The present invention is illustrated by the following examples in detail below, but is not limit thereto.

Evaluations of a thermoplastic elastomer composition and a molded article were conducted by the following methods.

[1] Complex dynamic viscosity $\eta^*(1)$ and Newtonian viscosity index n

The storage modulus $G'(\omega)$ and the loss modulus $G''(\omega)$ were measured by using a Dynamic Analyzer (type RDR-7700) manufactured by Rheometrics at a vibration frequency ($\omega$) of 1 radian/second or 100 radian/second, and the complex dynamic viscosities $\eta^*(1)$ and $\eta^*(100)$ were calculated according to the above-mentioned calculation equation (2). The measurement was conducted at parallel plates mode, an applied strain of 5%, and a sample temperature of 250° C.

The Newtonian viscosity index n was calculated according to the above-mentioned calculation equation (3) using $\eta^*(1)$ and $\eta^*(100)$.

[2] The total content (T) of vinyl aromatic compound units in the hydrogenated diene-based copolymer (B) was determined by a $^1$H-NMR measuring method (frequency: 90 MHz) using a carbon tetrachloride solution of (B).

[3] The ratio (V) of the number of hydrogenated conjugated diene units having a side chain of two or more carbon atoms to the total number of hydrogenated conjugated diene units in the hydrogenated diene-based copolymer (B)

It was measured by Morero method using infrared spectrum analysis.

[4] The ratio (S) of the content of a vinyl aromatic compound in the vinyl aromatic compound polymer block (a) to the total content of vinyl aromatic compounds in a hydrogenated diene-based copolymer in (B)

It was determined by a $^1$H-NMR measuring method (frequency: 90 MHz) using a carbon tetrachloride solution of (B).

[5] Hydrogenation ratio of double bonds of conjugated diene units in a hydrogenated diene-based copolymer was determined by a $^1$H-NMR measuring method (frequency: 90 MHz) using a carbon tetrachloride solution of (B).

[6] Number average molecular weight of a hydrogenated diene-based copolymer

It was determined by a gel permeation chromatography (GPC) method at 38° C. using a tetrahydrofuran solution of (B), as polystyrene-reduced value.

[7] Whitening on bending of a molded article obtained by powder molding of a thermoplastic elastomer composition for powder molding A molded sheet having a thickness of 1 mm obtained by a powder slush molding described below was cut into 1 cm×5 cm, bent with a bending load of 1 kg, and after 1 minute, the load was removed, and the whitening on bending was evaluated according to the following criteria.

1: Whitened portion was recognized.
2: Whitened portion was not recognized.

[8] Change of appearance when a molded article obtained by powder molding of a thermoplastic elastomer composition is heated A molded sheet having a thickness of 1 mm obtained by a powder slush molding described below was cut into 15 cm×15 cm, placed for 100 hours in a gear oven (manufactured by (TABAI K. K., Perfect Oven, type PH-200) of which temperature in the chamber was controlled to 110° C., gloss values before and after the heating were measured by a digital deformation photometer (manufactured by Suga Shikenki K. K., type UGV-5DI, reflection angle: 60°), and the appearance change was judged based on the difference in gloss values before and after the heating according to the criteria described below:

1: Difference in gloss values was over 0.6.
2: Difference in gloss values was over 0.3 and not more than 0.6.
3: Difference in gloss values was 0.3 or less.

[9] Tensile property of a molded article obtained by powder molding of a thermoplastic elastomer composition From a molded sheet having a thickness of 1 mm obtained by a powder slush molding described below, a specimen was punched out using dumbbell of JIS No. 1, and subjected to a tensile test at a tension speed of 200 mm/min., and the strength and elongation at break were measured.

[10] Solid viscoelasticity of a two-component composition composed of (G) and (H)

A viscoelasticity measuring apparatus, RHEOVIBRON (type DDV-II-EA) manufactured by Orientec Kogyo K. K. was used, and the tensile mode was applied. A sample of 2 cm×5 cm (distance between chucks: 3.5 cm)×0.1 mm thickness was made by a press molding, and the solid viscoelasticity was measured by vibrating the sample at a temperature from −150° C. to 130° C., a temperature raising speed of 2° C./min., a vibration frequency of 110 Hz, and a vibration amplitude of 16 μm, and the peak temperature and intensity of tan δ were measured.

[11] Change of appearance when a two-layer molded article is heated

A two-layer molded article obtained by a powder slush molding described below was placed for 24 hours in a gear oven (manufactured by Yamato Kagaku K. K., semi-explosion proof drier) of which temperature in the chamber was controlled to 110° C., change of gloss values before and after the heating was judged according to the criteria described below. The gloss value was measured by a digital glossimeter (manufactured by Murakami Shikisai Gijutsu Kenkyusho, GM-26D, reflection angle: 60° C.).

○: Difference in gloss values was less than 1.0
Δ: Difference in gloss values was 1.0 or more and less than 2.5
X: Difference in gloss values was 2.5 or more

[12] Change of appearance when a two-layer molded article is bent (shaping property)

A two-layer molded article obtained by a powder slush molding described below was bent for 1 minute so that a load of 200 g/cm was applied, then, change of conditions of the bent portion was judged according to the criteria described below:

○: Bent portion was not whitened
X: Bent portion was significantly whitened

[13] Cushioning property of a two-layer molded article A hardness of the two-layer molded article obtained by a powder slush molding described below was measured according to JIS K-6253, and this value was used as an index of the cushioning property.

Example 1

[Production of Powder of Thermoplastic Elastomer Composition]

[100 parts by weight of a propylene-ethylene copolymer resin [manufactured by Sumitomo Chemical Co., Ltd., ethylene unit content=5% by weight, MFR=228 g/10 min., crystallinity=70%], 100 parts by weight of a hydrogenated product of a styrene-butadiene-styrene-styrene copolymer (corresponding to structure (a)–(b1)–(a) [total content of styrene units=13% by weight, the content of a vinyl aromatic compound unit in (a) based on the total content of styrene units=69%, MFR=8 g/10 min., the ratio of a hydrogenated conjugated diene unit having a side chain of 2 or more carbon atoms based on the total amount of hydrogenated conjugated diene units=70%, hydrogenation ratio=98%, number average molecular weight=170000], and carbon black as black pigment in an amount of 1 part by weight based on 100 parts by weight of the propylene-ethylene copolymer resin were kneaded with a single screw kneader (manufactured by Tanabe Plastic Kikai K. K., VS40 mm, extruder) at a temperature of 170° C. to obtain a composition (η*(1)=1.2×10$^3$ poise, n=0.07), and this was cut using a cutting machine to obtain pellets.

The pellets were cooled to −120° C. with liquid nitrogen, then, ground while maintaining the cooled condition, to obtain a powder of the thermoplastic elastomer composition [passed through a Tyler standard sieve: 42 mesh (opening 355 μm×355 μm)].

[Production of Molded Article by Powder Slush Molding]

The resulted powder of a thermoplastic elastomer composition was fed on the molding surface of a mold with grain patterns (30 cm square) heated at 280° C., then, left for 15 seconds, the excess powder were dropped off, and stored in an oven at 280° C. for 1 minute.

Then, a mold carrying a powder of a thermoplastic elastomer composition melted in the form of a sheet was cooled with water, and the sheet was released from the mold, to obtain a molded article of the thermoplastic elastomer. The evaluation results of the molded article are shown in Table 2.

Examples 2 and 3

A molded article was obtained according to Example 1 except that a hydrogenated product of a styrene-butadiene-styrene-styrene copolymer shown in Example 2 or 3 of Table 1 was used. The evaluation results are shown in Table 2.

Examples 4 and 5

A molded article was obtained according to Example 1 except that a hydrogenated product of a styrene-butadiene-styrene-styrene copolymer shown in Example 4 or 5 of Table 3 was used. The evaluation results are shown in Table 4.

Examples 6 and 7

A molded article was obtained according to Example 1 except that a hydrogenated compound of a styrene-butadiene-styrene-styrene copolymer shown in Example 6 or 7 of Table 5 was used. The evaluation results are shown in Table 6.

Examples 8 and 9

A molded article was obtained according to Example 1 except that a hydrogenated compound of a styrene-butadiene-styrene-styrene copolymer shown in Example 8 or 9 of Table 7 was used. The evaluation results are shown in Table 8.

Comparative Examples 1 and 2

A molded article was obtained according to Example 1 except that a hydrogenated product of a styrene-butadiene-styrene-styrene copolymer(Comparative Example 1) or a hydrogenated product of a styrene-butadiene-styrene copolymer(Comparative Example 2) shown in Table 9 was used. The evaluation results are shown in Tables 10.

Example 10

A molded article was obtained according to Example 1 except that 100 parts by weight of a propylene-ethylene copolymer resin [manufactured by Sumitomo Chemical Co., Ltd., ethylene unit content=5% by weight, MFR=228 g/10 min., crystallinity=70%], 100 parts by weight of a hydrogenated product of a styrene-butadiene-styrene-styrene copolymer [total content of styrene units=16% by weight, the content of a vinyl aromatic compound unit in (a) based on the total content of styrene units=85%, MFR=10 g/10 min., the ratio of a hydrogenated conjugated diene unit having a side chain of 2 or more carbon atoms based on the total amount of hydrogenated conjugated diene units=75%, hydrogenation ratio=98%, number average molecular weight=13000], 50 parts by weight an ethylene-α-olefin-based rubber [manufactured by Sumitomo Chemical Co., Ltd., Esprene V0141, propylene unit content=27% by weight, MFR=1 g/10 min.] and black carbon black were kneaded by using a twin screw kneader at a temperature of 180° C. to obtain a composition [$\eta^*(1)$=2.0×10³ poise, n=0.10]. The evaluation results thereof are shown in Table 12.

TABLE 1

(b) Hydrogenated diene-based copolymer

| | Example | | |
|---|---|---|---|
| | 1 | 2 | 3 |
| Structure of hydrogenated diene-based copolymer | (a)-(b1)-(a) | | |
| The total content of styrene units (% by weight) | 13 | 16 | 14 |
| The ratio (S:%) of the content of the vinyl aromatic compound unit in (A) to the total content of vinyl aromatic compound units | 69 | 85 | 81 |
| MFR (g/10 min.) | 8 | 10 | 12 |
| The ratio (V:%) of the number of hydrogenated conjugated diene units having a side chain of two or more carbon atoms to the total number of hydrogenated conjugated diene units | 70 | 75 | 72 |
| Relation expression (1) is satisfied or not * (right side value) $V \leq 0.375 \times S + 1.25 \times T + 40$ (1) | ○ (82) | ○ (92) | ○ (88) |
| Hydrogenation ratio (%) of double bonds of conjugated diene units | 98 | 98 | 98 |
| Number average molecular weight of hydrogenated diene-based copolymer (×10000) | 17 | 13 | 13 |

* ○: relation expression (1) is satisfied
X: relation expression (1) is not satisfied (hereinafter, the same)

TABLE 2

Physical properties of thermoplastic elastomer composition and molded article thereof

| | Example | | |
|---|---|---|---|
| | 1 | 2 | 3 |
| $\eta^*(1)$ (poise) | 1.2 × 10³ | 2.0 × 10³ | 7 × 10² |
| n | 0.07 | 0.10 | 0.04 |
| Bending whitening property of molded article | 2 | 2 | 2 |
| Change of appearance when molded article is heated | 3 | 3 | 3 |
| Strength at break (kg/cm²) | 99 | 95 | 120 |
| Elongation at break (%) | 420 | 500 | 580 |

TABLE 3

(b) Hydrogenated diene-based copolymer

| | Example | |
|---|---|---|
| | 4 | 5 |
| Structure of hydrogenated diene-based copolymer | (a)-(b1)-(a) | |
| The total content of styrene units (% by weight) | 10 | 11 |
| The ratio (S:%) of the content of the vinyl aromatic compound unit in (A) to the total content of vinyl aromatic compound units | 72 | 59 |
| MFR (g/10 min.) | 15 | 10 |
| The ratio (V:%) of the number of hydrogenated conjugated diene units having a side chain of two or more carbon atoms to the total number of hydrogenated conjugated diene units | 70 | 69 |
| Relation formula (1) is satisfied or not (right side value) | ○ (80) | ○ (76) |
| Hydrogenation ratio (%) of double bonds of conjugated diene units | 98 | 98 |

TABLE 3-continued

(b) Hydrogenated diene-based copolymer

| | Example | |
|---|---|---|
| | 4 | 5 |
| Number average molecular weight of hydrogenated diene-based copolymer (X10000) | 16 | 18 |

TABLE 4

Physical properties of thermoplastic elastomer composition and molded article thereof

| | Example | |
|---|---|---|
| | 4 | 5 |
| η‡(1) (poise) | 9 × 10² | 1.0 × 10³ |
| n | 0.04 | 0.04 |
| Bending whitening property of molded article | 2 | 2 |
| Change of appearance when molded article is heated | 3 | 3 |
| Strength at break (kg/cm²) | 81 | 94 |
| Elongation at break (%) | 350 | 450 |

TABLE 5

(b) Hydrogenated diene-based copolymer

| | Example | |
|---|---|---|
| | 6 | 7 |
| Structure of hydrogenated diene-based copolymer | (a)-(b1)-(a) | |
| The total content of styrene units (% by weight) | 15 | 12 |
| The ratio (S:%) of the content of the vinyl aromatic compound unit in (A) to the total content of vinyl aromatic compound units | 54 | 81 |
| MFR (g/10 min.) | 15 | 9 |
| The ratio (V:%) of the number of hydrogenated conjugated diene units having a side chain of two or more carbon atoms to the total number of hydrogenated conjugated diene units | 78 | 76 |
| Relation formula (1) is satisfied or not (right side value) | ○ (79) | ○ (85) |
| Hydrogenation ratio (%) of double bonds of conjugated diene units | 98 | 98 |
| Number-average molecular weight of hydrogenated diene-based copolymer (X10000) | 16 | 14 |

TABLE 6

Physical properties of thermoplastic elastomer composition and molded article thereof

| | Example | |
|---|---|---|
| | 6 | 7 |
| η*(1) (poise) | 8 × 10² | 1.0 × 10³ |
| n | 0.04 | 0.06 |
| Bending whitening property of molded article | 2 | 2 |

TABLE 6-continued

Physical properties of thermoplastic elastomer composition and molded article thereof

| | Example | |
|---|---|---|
| | 6 | 7 |
| Change of appearance when molded article is heated | 2 | 3 |
| Strength at break (kg/cm²) | 155 | 174 |
| Elongation at break (%) | 720 | 700 |

TABLE 7

(b) Hydrogenated diene-based copolymer

| | Example | |
|---|---|---|
| | 8 | 9 |
| Structure of hydrogenated diene-based copolymer | (a)-(b1)-(a) | |
| The total content of styrene units (% by weight) | 14 | 13 |
| The ratio (S:%) of the content of the vinyl aromatic compound unit in (A) to the total content of vinyl aromatic compound units | 53 | 81 |
| MFR (g/10 min.) | 12 | 10 |
| The ratio (V:%) of the number of hydrogenated conjugated diene units having a side chain of two or more carbon atoms to the total number of hydrogenated conjugated diene units | 65 | 63 |
| Relation formula (1) is satisfied or not (right side value) | ○ (77) | ○ (87) |
| Hydrogenation ratio (%) of double bonds of conjugated diene units | 98 | 98 |
| Number average molecular weight of hydrogenated diene-based copolymer (X10000) | 15 | 13 |

TABLE 8

Physical properties of thermoplastic elastomer composition and molded article thereof

| | Example | |
|---|---|---|
| | 8 | 9 |
| η*(1) (poise) | 1.1 × 10³ | 1.1 × 10³ |
| n | 0.05 | 0.04 |
| Bending whitening property of molded article | 2 | 2 |
| Change of appearance when molded article is heated | 3 | 3 |
| Strength at break (kg/cm²) | 81 | 133 |
| Elongation at break (%) | 380 | 490 |

TABLE 9

Hydrogenated diene-based copolymer

| | Comparative Example | |
|---|---|---|
| | 1 | 2 |
| Structure of hydrogenated diene-based copolymer | (a)-(b1)-(a) | (a)-(b3)-(a) |
| The total content of styrene units (% by weight) | 9 | 20 |

TABLE 9-continued

Hydrogenated diene-based copolymer

| | Comparative Example | |
|---|---|---|
| | 1 | 2 |
| The ratio (S:%) of the content of the vinyl aromatic compound unit in (A) to the total content of vinyl aromatic compound units | 48 | 100 |
| MFR (g/10 min.) | 9 | 30 |
| The ratio (V:%) of the number of hydrogenated conjugated diene units having a side chain of two or more carbon atoms to the total number of hydrogenated conjugated diene units | 80 | 42 |
| Relation formula (1) is satisfied or not (right side value) | X (69) | ○ (103) |
| Hydrogenation ratio (%) of double bonds of conjugated diene units | 98 | 98 |
| Number-average molecular weight of hydrogenated diene-based copolymer (X10000) | 20 | 10 |

TABLE 10

Physical properties of thermoplastic elastomer composition and molded article thereof

| | Comparative Example | |
|---|---|---|
| | 1 | 2 |
| $\eta^*(1)$ (poise) | $1.7 \times 10^3$ | $8 \times 10^2$ |
| n | 0.03 | 0.07 |
| Bending whitening property of molded article | 2 | 1 |
| Change of appearance when molded article is heated | 1 | 2 |
| Strength at break (kg/cm$^2$) | 108 | 70 |
| Elongation at break (%) | 610 | 240 |

TABLE 11

(b) Hydrogenated diene-based copolymer

| | Example 10 |
|---|---|
| Structure of hydrogenated diene-based copolymer | (a)-(b1)-(a) |
| The total content of styrene units (% by weight) | 16 |
| The ratio (S:%) of the content of the vinyl aromatic compound unit in (A) to the total content of vinyl aromatic compound units | 85 |
| MFR (g/10 min.) | 10 |
| The ratio (V:%) of the number of hydrogenated conjugated diene units having a side chain of two or more carbon atoms to the total number of hydrogenated conjugated diene units | 75 |
| Relation formula (1) is satisfied or not (right side value) | ○ (92) |
| Hydrogenation ratio (%) of double bonds of conjugated diene units | 98 |
| Number-average molecular weight of hydrogenated diene-based copolymer (X10000) | 13 |

TABLE 12

Physical properties of thermoplastic elastomer composition and molded article thereof

| | Example 10 |
|---|---|
| $\eta^*(1)$ (poise) | $2.0 \times 10^3$ |
| n | 0.10 |
| Bending whitening property of molded article | 2 |
| Change of appearance when molded article is heated | 3 |
| Strength at break (kg/cm$^2$) | 70 |
| Elongation at break (%) | 550 |

Examples 11 to 14

A molded article was obtained according to Example 1 except that a hydrogenated products of a styrene-butadiene-styrene copolymers (corresponding to structure (a)–(b3)–(a)) shown in Table 13 were used instead of the hydrogenated compound of the styrene-butadiene·styrene-styrene copolymer in Example 1. The evaluation results are shown in Table 14.

TABLE 13

(b) Hydrogenated diene-based copolymer

| | Example | | | |
|---|---|---|---|---|
| | 11 | 12 | 13 | 14 |
| Structure of hydrogenated diene-based copolymer | (a)-(b3)-(a) | | | |
| The total content of styrene units (% by weight) | 15 | 15 | 15 | 15 |
| The ratio (S:%) of the content of the vinyl aromatic compound unit in (A) to the total content of vinyl aromatic compound units | 100 | 100 | 100 | 100 |
| MFR (g/10 min.) | 30 | 30 | 30 | 30 |
| The ratio (V:%) of the number of hydrogenated conjugated diene units having a side chain of two or more carbon atoms to the total number of hydrogenated conjugated diene units | 76 | 78 | 80 | 81 |
| Relation formula (1) is satisfied or not (right side value) | ○ (96) | ○ (96) | ○ (96) | ○ (96) |
| Hydrogenation ratio (%) of double bonds of conjugated diene units | 98 | 98 | 98 | 98 |
| Number-average molecular weight of hydrogenated diene-based copolymer (X10000) | 13 | 13 | 13 | 13 |

TABLE 14

Physical properties of thermoplastic elastomer composition and molded article thereof

| | Example | | | |
|---|---|---|---|---|
| | 11 | 12 | 13 | 14 |
| $\eta^*(1)$ (poise) | $1.1 \times 10^3$ | $1.0 \times 10^3$ | $1.0 \times 10^3$ | $1.0 \times 10^3$ |
| n | 0.06 | 0.04 | 0.04 | 0.03 |
| Bending whitening property of molded article | 2 | 2 | 2 | 2 |
| Change of appearance when molded article is heated | 3 | 3 | 3 | 3 |

TABLE 14-continued

Physical properties of thermoplastic elastomer composition and molded article thereof

| | Example | | | |
|---|---|---|---|---|
| | 11 | 12 | 13 | 14 |
| Strength at break (kg/cm$^2$) | 103 | 120 | 136 | 142 |
| Elongation at break (%) | 680 | 690 | 770 | 770 |

Example 15

A molded article was obtained according to Example 1 except that 100 parts by weight of a propylene-ethylene copolymer resin [manufactured by Sumitomo Chemical Co., Ltd., ethylene unit content=5% by weight, MFR=228 g/10 min., crystallinity=70%], 100 parts by weight of a hydrogenated product of a styrene-butadiene-styrene copolymer (corresponding to structure (a)-(b3)-(a)) shown in Table 15, 50 parts by weight an ethylene-propylene copolymer rubber [manufactured by Sumitomo Chemical Co., Ltd., Esprene V0141, propylene unit content=27% by weight, MFR=0.7 g/10 min.] and 2.5 parts by weight of carbon black as a black pigment were used. The evaluation results thereof are shown in Table 16.

Example 16

A molded article was obtained according to Example 1 except that 100 parts by weight of a propylene-ethylene copolymer resin (manufactured by Sumitomo Chemical Co., Ltd., ethylene unit content=5% by weight, MFR=228 g/10 min., crystallinity=70%), 108 parts by weight of a hydrogenated product of a styrene-butadiene-styrene copolymer (corresponding to structure (a)-(b3)-(a)) shown in Table 15, 38 parts by weight an ethylene-propylene copolymer rubber (manufactured by Sumitomo Chemical Co., Ltd., Esprene V0141, propylene unit content=27% by weight, MFR=0.7 g/10 min.), a hydrogenated product of polybutadiene (manufactured by JSR Corp., CEBC6200P, MFR=2.5 g/10 min., hydrogenation ratio=98%] and 2.5 parts by weight of carbon black as a black pigment were used. The evaluation results thereof are shown in Table 16.

TABLE 15

(b) Hydrogenated diene-based copolymer

| | Example | |
|---|---|---|
| | 15 | 16 |
| Structure of hydrogenated diene-based copolymer | (a)-(b3)-(a) | |
| The total content of styrene units (% by weight) | 15 | 15 |
| The ratio (S:%) of the content of the vinyl aromatic compound unit in (A) to the total content of vinyl aromatic compound units | 100 | 100 |
| MFR (g/10 min.) | 30 | 30 |
| The ratio (V:%) of the number of hydrogenated conjugated diene units having a side chain of two or more carbon atoms to the total number of hydrogenated conjugated diene units | 80 | 80 |
| Relation formula (1) is satisfied or not (right side value) | ◯ (96) | ◯ (96) |
| Hydrogenation ratio (%) of double bonds of conjugated diene units | 98 | 98 |
| Number-average molecular weight of hydrogenated diene-based copolymer (X10000) | 13 | 13 |

TABLE 16

Physical properties of thermoplastic elastomer composition and molded article thereof

| | Example | |
|---|---|---|
| | 15 | 16 |
| η*(1) (poise) | 1.3 × 10$^3$ | 1.3 × 10$^3$ |
| n | 0.05 | 0.04 |
| Bending whitening property of molded article | 2 | 2 |
| Change of appearance when molded article is heated | 3 | 3 |
| Strength at break (kg/cm$^2$) | 85 | 94 |
| Elongation at break (%) | 680 | 690 |

Reference Example 1
(Production of layer(I) producing powder)

100 parts by weight of a propylene-ethylene copolymer resin [manufactured by Sumitomo Chemical Co., Ltd., ethylene unit content=5% by weight, MFR=220 g/10 min., crystallinity=70%], 100 parts by weight of a hydrogenated product of a styrene-butadiene-styrene copolymer [corresponding to structure (a)-(b1)-(a), total content of styrene units=16% by weight, the content of a vinyl aromatic compound unit in (a) based on the total content of styrene units=85%, MFR=10 g/10 min., the ratio of a hydrogenated conjugated diene unit having a side chain of 2 or more carbon atoms based on the total amount of hydrogenated conjugated diene units=75%, hydrogenation ratio=98%, number average molecular weight=130000], 50 parts by weight an ethylene-propylene copolymer rubber (manufactured by Sumitomo Chemical Co., Ltd., Esprene V0141, propylene unit content=27% by weight), and 1 part by weight of carbon black as a black pigment were kneaded by using a single screw kneader (manufactured by Tanabe Plastic Kikai K. K., VS40 mm, extruder) at a temperature of 170° C. to obtain a composition, and this was cut using a cutting machine to obtain pellets [η*(1)=2.5×10$^3$ poise, n=0.12].

The pellets were cooled to −120° C. with liquid nitrogen, then, ground while maintaining cooled condition, to obtain a powder of a thermoplastic elastomer composition for producing the layer(I) [passed through a Tyler standard sieve: 42 mesh (opening 355 μm×355 μm)].

Reference Example 2
(Measurement of temperature and strength of tan δ peak of composition of polyolefin-based resin (G) and rubbery polymer (H))

As the component (H), a hydrogenated product of a butadiene-styrene copolymer [styrene unit content=10% by weight, hydrogenation ratio 99%, the ratio of a hydrogenated conjugated diene unit having a side chain of 2 or more carbon atoms based on the total amount of hydrogenated conjugated diene units=80%, number average molecular weight=160000, peak temperature of tan δ peak=−17° C., intensity=1.5] was used. As the polyolefin-based resin (G), a propylene-ethylene random copolymer resin (peak temperature of tan δ peak=−7° C., intensity=0.12, ethylene unit content=5% by weight, MFR=228 g/10 min.) was used.

These were kneaded by using a LABOPLASTOMILL (manufactured by Toyo Seiki K. K., type 30C150) under conditions of 180° C. and 50 rpm for 10 minutes at a ratio shown in Table 17 to obtain a composition (charged amount to the LABOPLASTOMILL was 84 g), and the peak temperature and strength of tan δ peak of the resulted composition were measured by solid viscoelasticity measurement. The resulted composition gave a new single tan δ peak at a temperature different from both of the tan δ peak temperature of (G) and the tan δ peak temperature of (H), in a temperature range from −70 to 30° C. The peak temperature and strength of tan δ peak of these compositions are shown in Table 17.

TABLE 17

Temperature and strength of tan δ peak of composition of (G) and (H)

| Composition: parts by weight | | | | | |
|---|---|---|---|---|---|
| (G) | 100 | 75 | 50 | 25 | 0 |
| (H) | 0 | 25 | 50 | 75 | 100 |
| Tan δ peak | | | | | |
| Temperature | 7 | −1 | −7 | −11 | −17 |
| Intensity | 0.12 | 0.20 | 0.39 | 0.73 | 1.5 |

(Production of layer(II) producing powder]

100 parts by weight of a propylene-ethylene copolymer resin (manufactured by Sumitomo Chemical Co., Ltd., ethylene unit content=5% by weight, MFR=220 g/10 min., crystallinity=70%), 100 parts by weight of the above-described hydrogenated compound of the butadiene-styrene copolymer (H), 50 parts by weight an ethylene-propylene copolymer rubber (manufactured by Sumitomo Chemical Co., Ltd., Esprene V0141, propylene unit content=27% by weight), and 1 part by weight of carbon black as a black pigment were kneaded by using a single screw kneader (manufactured by Tanabe Plastic Kikai K. K., VS40 mm, extruder) at a temperature of 170° C. to obtain a composition, and this was cut using a cutting machine to obtain pellets ($\eta^*(1)=2.7\times10^3$ poise, n=0.07).

The pellets were cooled to −120° C. with liquid nitrogen, then, ground while maintaining cooled condition [passed through a Tyler standard sieve: 42 mesh (opening 355 μm×355 μm)].

Into 100 parts by weight of this ground compound was mixed 3 parts by weight of a powdery foaming agent (manufactured by Sankyo Kasei K. K., azodicarboneamide (CAP-500, decomposition temperature=150° C.)) by using a Super Mixer (manufactured by Kawata Seisakusho K. K., 5L Super Mixer SVM-5) at 23° C. and 150 rpm for 5 minutes, to obtain a thermoplastic elastomer composition containing the foaming agent for producing the layer(II).

Reference Example 3
(Production of layer(I) producing powder]

100 parts by weight of an oil-extended EPDM (ethylene-propylene-5-ethylidene-2-norbornen copolymer rubber: propylene unit content=28% by weight, iodine value=12) (wherein, 50% by weight of a mineral oil-based softening agent (Diana Process Oil PW-380, manufactured by Idemitsu Kosan Co., Ltd.) is contained), 100 parts by weight of a propylene-ethylene copolymer resin (ethylene unit content=5% by weight, MFR=90 g/10 min.), and 0.4 parts by weight of a crosslinking aid (Sumifine BM, bismaleimide, manufactured by Sumitomo Chemical Co., Ltd.) were kneaded for 10 minutes by using a Banbury mixer, then, the resulted composition was pelletized using an extruder to obtain a master batch. Then, to 100 parts by weight of this master batch was added 0.1 part by weight of an organic peroxide (manufactured by Sanken Kako K. K., Sunperox APO, 2,5-dimethyl-2,5-di(t-butylperoxino) hexane, and the mixture was dynamically crosslinked at 220° C. using a twin screw kneader (manufactured by The Japan Steel Works, Ltd., TEX-44) to obtain a composition ($\eta^*(1)=5.2\times10^3$ poise, n=0.31), this was cut using a cutting machine to obtain pellets.

The pellets were cooled to −120° C. with liquid nitrogen, then, ground while maintaining cooled condition, to obtain a powder of a thermoplastic elastomer composition for producing the layer(I) (passed through a Tyler standard sieve: 42 mesh (opening 355 μm×355 μm)).

Example 17

The powder obtained in Reference Example 1 was fed on the molding surface of a mold with grain patterns (30 cm square) heated at 280° C., then, 8 seconds after initiation of the feeding, unadhered excess powder was dropped off from the mold. Then, 20 seconds after the dropping off, the powder obtained in Reference Example 2 was fed to the mold on which the powder obtained in Reference Example 1 was in the adhered state. 20 seconds after initiation of the feeding, excess powder was dropped off.

Then, the product was stored in an oven at 280° C. for 1 minute, the mold was cooled with water (cooling by shower from the surface of the mold), and a two-layer molded article was released from the mold. The evaluation results of this two-layer molded article are shown in Table 18.

Comparative Example 3

A two-layer molded article was obtained according to Example 17 except that a hydrogenated product of a styrene-butadiene-styrene-styrene copolymer [corresponding to (a)–(b1)–(a), total content of styrene units=10% by weight, the content of a vinyl aromatic compound unit in (a) based on the total content of styrene units=48%, MFR=10 g/10 min., the ratio of a hydrogenated conjugated diene unit having a side chain of 2 or more carbon atoms based on the total amount of hydrogenated conjugated diene units=80%, hydrogenation ratio=98%, number-average molecular weight=130000] was used instead of the hydrogenated product of the styrene-butadiene styrene-styrene copolymer described in Reference Example 1 used in Example 17. The evaluation results thereof are shown in Table 18.

Comparative Example 4

A two-layer molded article was obtained according to Example 17 except that a hydrogenated product of a butadiene-styrene copolymer [total content of styrene units= 16% by weight, the ratio of a hydrogenated conjugated diene unit having a side chain of 2 or more carbon atoms based on the total amount of hydrogenated conjugated diene units= 75%, hydrogenation ratio=98%, number average molecular weight=160000. However, a composition obtained by kneading with the above-described propylene-ethylene copolymer resin did not give a new single tan δ peak at a temperature different from both of the tan δ peak temperature of (G) and the tan δ peak temperature of (H), in a temperature range from −70 to 30° C., and gave the same peak to each said temperature.] was used instead of the hydrogenated product of the butadiene-styrene copolymer described in Reference Example 2 in Example 17. The evaluation results thereof are shown in Table 18.

Comparative Example 5

A two-layer molded article was obtained according to Example 17 except that the powder described in Reference Example 3 was used instead of the powder described in Reference Example 1 used in Example 17. The evaluation results thereof are shown in Table 18.

TABLE 18

|  | Example | Comparative Example | | |
|---|---|---|---|---|
|  | 17 | 3 | 4 | 5 |
| Thickness of two-layer molded article (mm) | | | | |
| layer(I) | 0.8 | 0.8 | 0.8 | 0.8 |
| layer(II) | 2.7 | 2.7 | 2.7 | 2.7 |
| Change of appearance when two-layer molded article is heated | ◯ | X | ◯ | ◯ |
| Change of appearance when two-layer molded article is bent (shaping property) | ◯ | ◯ | ◯ | X |
| Cushioning property of two-layer molded article (JIS-A) | 58 | 58 | 62 | 66 |

As described above, according to the present invention, a thermoplastic elastomer composition for powder molding which comprises a polyolefin-based resin and a hydrogenated diene-based copolymer having a specific structure as essential components, and which can provide a molded article that is excellent in flexibility, is not easily whitened on bending in the bent portion, and further, does not reveal gloss when heated at temperatures from about 80° C. to less than the melting point of the polyolefin-based resin; a powder prepared from the composition; a powder molding using the powder; and a molded article obtained by a powder molding the powder can be provided.

What is claimed is:

1. A two-layer molded article obtained by laminating on one surface of a molded article a foamed layer, wherein said molded article is obtained by powder molding a powder of a thermoplastic elastomer composition obtained by mechanically pulverizing a thermoplastic elastomer composition comprising 100 parts by weight of the following component (A) and 10 to 1000 parts by weight of the following component (B), wherein the composition has a complex dynamic viscosity η*(1) at 250° C. of 1.5×10⁵ poise or less and a Newtonian viscosity index n of 0.67 or less:

(A): a polyolefin-based resin, and
(B): a hydrogenated diene-based copolymer satisfying all of the following conditions ① to ⑦,
①: the hydrogenated diene-based copolymer comprises the following structural units (a) and (b):
(a): a vinyl aromatic compound polymer block,
(b): at least one kind of block selected from the following (b1), (b2) and (b3):
(b1): a block obtained by hydrogenation of a random copolymer block composed of a vinyl aromatic compound and a conjugated diene,
(b2): a block obtained by hydrogenation of a block in the form of taper composed of a vinyl aromatic compound and a conjugated diene in which the amount of the vinyl aromatic compound increases gradually,
(b3): a block obtained by hydrogenation of a conjugated diene polymer block,
②: the total content (T: percentage) of vinyl aromatic compound units contained in the hydrogenated diene-based copolymer from 10 to 18% by weight,
③: the ratio (S: percentage) of the content of the vinyl aromatic compound unit of (a) in ① to the total content of vinyl aromatic compound units contained in the hydrogenated diene-based copolymer is 3% or more,
④: the ratio (V: percentage) of the number of hydrogenated conjugated diene units having a side chain of two or more carbon atoms to the total number of hydrogenated conjugated diene units in the hydrogenated diene-based copolymer is over 60%,
⑤: (T) in ②, (S) in ③ and (V) in ④ in the hydrogenated diene-based copolymer satisfy the relation represented by the following formula (1):

$$V \leq 0.375 \times S + 1.25 \times T + 40 \quad (1)$$

⑥: 80% or more of double bonds in conjugated diene units in the hydrogenated diene-based copolymer are hydrogenated, and
⑦: the number-average molecular weight of the hydrogenated diene-based copolymer is from 50000 to 400000, and
said foamed layer is prepared from a thermoplastic elastomer composition containing 100 parts by weight of the following component (G) and 10 to 1000 parts by weight of the following component (H):
(G): a polyolefin-based resin,
(H): a rubbery polymer, wherein, in tan δ-temperature-dependent curve obtained by measuring solid viscoelasticity of a composition prepared by kneading with (G), a new single tan δ peak is given at a temperature different from both of the tan δ peak temperature of (G) and the tan δ peak temperature of (H), in a temperature range from −70 to 30° C.

2. A multi-layer molded article obtained by laminating a thermoplastic core material on the foamed layer side of the two-layer molded article of claim 1.

3. A method for producing a multi-layer molded article, which comprises feeding a thermoplastic resin melt on the foamed layer side of the two-layer molded article of claim 1.

4. A method for producing a multi-layer molded article, which comprises putting a barrier layer on the foamed layer side of the two-layer molded article of claim 1, feeding a thermoplastic resin melt on the barrier layer and pressing.

5. A two-layer molded article obtained by laminating on one surface of a molded article a foamed layer, wherein said molded article is obtained by powder-molding a powder of a thermoplastic elastomer composition produced by a strand cut method, die face cut method or solvent treating method, the thermoplastic elastomer composition comprising 100 parts by weight of the following component (A) and 10 to 1000 parts by weight of the following component (B), wherein the composition has a complex dynamic viscosity η*(1) at 250° C. of 1.5×10⁵ poise or less and a Newtonian viscosity index n of 0.67 or less:

(A): a polyolefin-based resin, and
(B): a hydrogenated diene-based copolymer satisfying all of the following conditions ① to ⑦, ①: the hydrogenated diene-based copolymer comprises the following structural units (a) and (b):
(a): a vinyl aromatic compound polymer block,
(b): at least one kind of block selected from the following (b1), (b2) and (b3):
(b1): a block obtained by hydrogenation of a random copolymer block composed of a vinyl aromatic compound and a conjugated diene,
(b2): a block obtained by hydrogenation of a block in the form of taper composed of a vinyl aromatic compound and a conjugated diene in which the amount of the vinyl aromatic compound increases gradually,
(b3); a block obtained by hydrogenation of a conjugated diene polymer block,
②: the total content (T: percentage) of vinyl aromatic compound units contained in the hydrogenated diene-based copolymer from 10 to 18% by weight,
③: the ratio (S: percentage) of the content of the vinyl aromatic compound unit of (a) in ① to the total content of vinyl aromatic compound units contained in the hydrogenated diene-based copolymer is 3% or more,
④: the ratio (V: percentage) of the number of hydrogenated conjugated diene units having a side chain of two or more carbon atoms to the total number of hydrogenated conjugated diene units in the hydrogenated diene-based copolymer is over 60%,
⑤: (T) in ②, (S) in ③ and (V) in ④ in the hydrogenated diene-based copolymer satisfy the relation represented by the following formula (1):

$$V \leq 0.375 \times S + 1.25 \times T + 40 \tag{1}$$

⑥: 80% or more of double bonds in conjugated diene units in the hydrogenated diene-based copolymer are hydrogenated, and
⑦: the number-average molecular weight of the hydrogenated diene-based copolymer is from 50000 to 400000, and
said foamed layer is prepared from a thermoplastic elastomer composition containing 100 parts by weight of the following component (G) and 10 to 1000 parts by weight of the following component (H);
(G): a polyolefin-based resin,
(H): a rubber-like polymer wherein in tan δ-temperature-dependent curve obtained by measuring solid viscoelasticity of a composition prepared by kneading with (G), a novel single tan δ peak is given at a temperature different from both of the tan δ peak temperature of (G) and the tan δ peak temperature of (H), in a temperature range from −70 to 30° C.

6. A multi-layer molded article obtained by laminating a thermoplastic core material on the foamed layer side of the two-layer molded article of claim 5.

7. A method for producing a multi-layer molded article, which comprises feeding a thermoplastic resin melt on the foamed layer side of the two-layer molded article of claim 5.

8. A method for producing a multi-layer molded article, which comprises putting a barrier layer on the foamed layer side of the two-layer molded article of claim 5, feeding a thermoplastic resin melt on the barrier layer and pressing.

9. A multi-layer molded article obtained by laminating a thermoplastic resin core material on one surface of a molded article obtained by powder molding a powder of a thermoplastic elastomer composition obtained by mechanically pulverizing a thermoplastic elastomer composition comprising 100 parts by weight of the following component (A) and 10 to 1000 parts by weight of the following component (B), wherein the composition has a complex dynamic viscosity η*(1) at 250° C. of $1.5 \times 10^5$ poise or less and a Newtonian viscosity index n of 0.67 or less:
(A): a polyolefin-based resin, and
(B): a hydrogenated diene-based copolymer satisfying all of the following conditions ① to ⑦,
①: the hydrogenated diene-based copolymer comprises the following structural units (a) and (b):
(a): a vinyl aromatic compound polymer block,
(b): at least one kind of block selected from the following (b1), (b2) and (b3):
(b1): a block obtained by hydrogenation of a random copolymer block composed of a vinyl aromatic compound and a conjugated diene,
(b2): a block obtained by hydrogenation of a block in the form of taper composed of a vinyl aromatic compound and a conjugated diene in which the amount of the vinyl aromatic compound increases gradually,
(b3): a block obtained by hydrogenation of a conjugated diene polymer block,
②: the total content (T: percentage) of vinyl aromatic compound units contained in the hydrogenated diene-based copolymer from 10 to 18% by weight,
③: the ratio (S: percentage) of the content of the vinyl aromatic compound unit of (a) in ① to the total content of vinyl aromatic compound units contained in the hydrogenated diene-based copolymer is 3% or more,
④: the ratio (V: percentage) of the number of hydrogenated conjugated diene units having a side chain of two or more carbon atoms to the total number of hydrogenated conjugated diene units in the hydrogenated diene-based copolymer is over 60%,
⑤: (T) in ②, (S) in ③ and (V) in ④ in the hydrogenated diene-based copolymer satisfy the relation represented by the following formula (1):

$$V \leq 0.375 \times S + 1.25 \times T + 40 \tag{1}$$

⑥: 80% or more of double bonds in conjugated diene units in the hydrogenated diene-based copolymer are hydrogenated, and
⑦: the number-average molecular weight of the hydrogenated diene-based copolymer is from 50000 to 400000.

10. A multi-layer molded article obtained by laminating a thermoplastic resin core material on one surface of a molded article obtained by powder-molding a powder of a thermoplastic elastomer composition produced by a strand cut method, die face cut method or a solvent treating method, the thermoplastic elastomer composition comprising 100 parts by weight of the following component (A) and 10 to 1000 parts by weight of the following component (B), wherein the composition has a complex dynamic viscosity η*(1) at 250° C. of $1.5 \times 10^5$ poise or less and a Newtonian viscosity index n of 0.67 or less:
(A): a polyolefin-based resin, and
(B): a hydrogenated diene-based copolymer satisfying all of the following conditions ① to ⑦,
①: the hydrogenated diene-based copolymer comprises the following structural units (a) and (b):
(a): a vinyl aromatic compound polymer block,
(b): at least one kind of block selected from the following (b1), (b2) and (b3):
(b1): a block obtained by hydrogenation of a random copolymer block composed of a vinyl aromatic compound and a conjugated diene,
(b2): a block obtained by hydrogenation of a block in the form of taper composed of a vinyl aromatic compound and a conjugated diene in which the amount of the vinyl aromatic compound increases gradually, (b3): a block obtained by hydrogenation of a conjugated diene polymer block, ②: the total content (T: percentage) of vinyl aromatic compound units contained in the hydrogenated diene-based copolymer from 10 to 18% by weight, ③: the ratio (S: percentage) of the content of the vinyl aromatic compound unit of (a) in ① to the total content of vinyl aromatic compound units contained in the hydrogenated diene-based copolymer is 3% or more, ④: the ratio (V: percentage) of the number of hydrogenated conjugated diene units having a side chain of two or more carbon atoms to the total number of hydrogenated conjugated diene units in the hydrogenated diene-based copolymer is over 60%, ⑤: (T) in ②, (S) in ③ and (V) in ④ in the hydrogenated diene-based copolymer satisfy the relation represented by the following formula (1):

$$V \leq 0.375 \times S + 1.25 \times T + 40 \tag{1}$$

⑥: 80% or more of double bonds in conjugated diene units in the hydrogenated diene-based copolymer are hydrogenated, and ⑦: the number-average molecular weight of the hydrogenated diene-based copolymer is from 50000 to 400000.

11. A method for producing a multi-layer molded article, which comprises feeding a thermoplastic resin melt on one surface of a molded article arid pressing, wherein said molded article is obtained by powder molding a powder of a thermoplastic elastomer composition obtained by mechanically pulverizing a thermoplastic elastomer composition comprising 100 parts by weight of the following component (A) and 10 to 1000 parts by weight of the following component (B), wherein the composition has a complex dynamic viscosity η*(1) at 250° C. of 1.5×10⁵ poise or less and a Newtonian viscosity index n of 0.67 or less:

(A): a polyolefin-based resin, and (B): a hydrogenated diene-based copolymer satisfying all of the following conditions ① to ⑦, ①: the hydrogenated diene-based copolymer comprises the following structural units (a) and (b):

(a): a vinyl aromatic compound polymer block, (b): at least one kind of block selected from the following (b1), (b2) and (b3):

(b1): a block obtained by hydrogenation of a random copolymer block composed of a vinyl aromatic compound and a conjugated diene, (b2): a block obtained by hydrogenation of a block in the form of taper composed of a vinyl aromatic compound and a conjugated diene in which the amount of the vinyl aromatic compound increases gradually, (b3): a block obtained by hydrogenation of a conjugated diene polymer block, ②: the total content (T: percentage) of vinyl aromatic compound units contained in the hydrogenated diene-based copolymer from 10 to 18% by weight, ③: the ratio (S: percentage) of the content of the vinyl aromatic compound unit of (a) in ① to the total content of vinyl aromatic compound units contained in the hydrogenated diene-based copolymer is 3% or more, ④: the ratio (V: percentage) of the number of hydrogenated conjugated diene units having a side chain of two or more carbon atoms to the total number of hydrogenated conjugated diene units in the hydrogenated diene-based copolymer is over 60%, ⑤: (T) in ②, (S) in ③ and (V) in ④ in the hydrogenated diene-based copolymer satisfy the relation represented by the following formula (1):

$$V \leq 0.375 \times S + 1.25 \times T + 40 \tag{1}$$

⑥: 80% or more of double bonds in conjugated diene units in the hydrogenated diene-based copolymer are hydrogenated, and ⑦: the number-average molecular weight of the hydrogenated diene-based copolymer is from 50000 to 400000.

12. A method for producing a multi-layer molded article, which comprises feeding a thermoplastic resin inch on one surface of a molded article and pressing, wherein said molded article is obtained by powder molding a powder of a thermoplastic elastomer composition for powder molding produced by a strand cut method, die face cut method or solvent treating method, the thermoplastic elastomer composition comprising 100 parts by weight of the following component (A) and 10 to 1000 parts by weight of the following component (B), wherein the composition has a complex dynamic viscosity η*(1) at 250° C. of 1.5×10⁵ poise or less and a Newtonian viscosity index n of 0.67 or less:

(A): a polyolefin-based resin, and (B): a hydrogenated diene-based copolymer satisfying all of the following conditions ① to ⑦, ①: the hydrogenated diene-based copolymer comprises the following structural units (a) and (b):

(a): a vinyl aromatic compound polymer block, (b): at least one kind of block selected from the following (b1), (b2) and (b3):

(b1): a block obtained by hydrogenation of a random copolymer block composed of a vinyl aromatic compound and a conjugated diene, (b2): a block obtained by hydrogenation of a block in the form of taper composed of a vinyl aromatic compound and a conjugated diene in which the amount of the vinyl aromatic compound increases gradually, (b3): a block obtained by hydrogenation of a conjugated diene polymer block, ②: the total content (T: percentage) of vinyl aromatic compound units contained in the hydrogenated diene-based copolymer from 10 to 18% by weight, ③: the ratio (S: percentage) of the content of the vinyl aromatic compound unit of (a) in ① to the total content of vinyl aromatic compound units contained in the hydrogenated diene-based copolymer is 3% or more, ④: the ratio (V: percentage) of the number of hydrogenated conjugated diene units having a side chain of two or more carbon atoms to the total number of hydrogenated conjugated diene units in the hydrogenated diene-based copolymer is over 60%, ⑤: (T) in ②, (S) in ③ and (V) in ④ in the hydrogenated diene-based copolymer satisfy the relation represented by the following formula (1):

$$V \leq 0.375 \times S + 1.25 \times T + 40 \tag{1}$$

⑥: 80% or more of double bonds in conjugated diene units in the hydrogenated diene-based copolymer are hydrogenated, and ⑦: the number-average molecular weight of the hydrogenated diene-based copolymer is from 50000 to 400000.

* * * * *